US006904421B2

(12) United States Patent
Shetty

(10) Patent No.: US 6,904,421 B2
(45) Date of Patent: Jun. 7, 2005

(54) METHODS FOR SOLVING THE TRAVELING SALESMAN PROBLEM

(75) Inventor: Ravindra K. Shetty, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 776 days.

(21) Appl. No.: 09/843,192

(22) Filed: Apr. 26, 2001

(65) Prior Publication Data

US 2003/0084011 A1 May 1, 2003

(51) Int. Cl.[7] .............................................. G06F 15/18
(52) U.S. Cl. ...................................................... 706/13
(58) Field of Search .......................................... 706/13

(56) References Cited

U.S. PATENT DOCUMENTS

| 5,155,845 | A | * | 10/1992 | Beal et al. ..................... 714/6 |
| 5,489,419 | A | * | 2/1996 | Diep et al. ................. 423/235 |
| 5,586,219 | A | | 12/1996 | Yufik ........................... 395/20 |
| 5,623,404 | A | | 4/1997 | Collins et al. .............. 395/209 |
| 5,737,728 | A | | 4/1998 | Sisley et al. ................... 705/8 |
| 5,848,402 | A | | 12/1998 | Pao et al. ...................... 706/13 |
| 6,052,678 | A | * | 4/2000 | Itoh et al. ..................... 706/13 |
| 6,182,008 | B1 | | 1/2001 | Nikiel et al. ................ 701/202 |
| 6,363,368 | B2 | * | 3/2002 | Shinagawa .................... 706/13 |
| 6,418,398 | B1 | * | 7/2002 | Dueck et al. ............... 702/181 |
| 2001/0011258 | A1 | * | 8/2001 | Shinagawa .................... 706/13 |

OTHER PUBLICATIONS

Augmenting Genetic Algorithms with Memory to Solve Traveling Salesman Problems, Sushil J. Louis, Gong Li, Dept. of Computer Science University of Nevada, (1997).*
Eshelman, L.J., "The CHC Adaptive Search Algorithm: How to Have Safe Search When Engaging in Nontraditional Genetic Recombination", In: *Foundations of Genetic Algorithms*, San Mateo, CA: Morgan Kaufmann Publishers, G.J.E. Rawlins, ed., pp. 265–283, (1991).

Fogel, D.B., "An Evolutionary Approach to the Traveling Salesman Problem", *Biological Cybernetics, 60* (2) , pp. 139–144, (1988).

Grefenstette, J., et al., "Genetic Algorithms for the Traveling Salesman Problem", *Proceedings of an International Conference on Genetic Algorithms and their Applications*, pp. 160–168, (Jul. 1985).

Kalantari, B., et al., "An algorithm for the traveling salesman problem with pickup and delivery customers", *European Journal of Operational Research, 22* (3), pp. 377–386, (1985).

Mitchell, M., "Genetic Algorithms: An Overview", *In: Introduction to Genetic Algorithms, Chapter 1*, Cambridge, Mass: The MIT Press, M. Mitchell, ed., pp. 1–34, (1996).

Yip, P.P., et al., "A New Approach to the Traveling Salesman Problem", *Proceedings of the International Joint Conference on Neural Networks, vol. 3 of 2*, Nagoya Congress Center, Japan, pp. 1569–1572, (Oct. 1993).

* cited by examiner

Primary Examiner—Anthony Knight
Assistant Examiner—Michael B. Holmes
(74) Attorney, Agent, or Firm—Kris T. Fredrick

(57) ABSTRACT

Solving a Traveling Salesman Problem (TSP) by selecting a set of locations to visit, selecting a starting point and an ending point from the set of locations, applying a search method to the set of locations, and providing a route as a solution to the TSP, where the search method is a combinatoric approach to a genetic search and the search method simultaneously minimizes distance and time. The route starts and ends in different locations and completes in polynomial time, such as O(n+k), where k is a constant. The solution to the TSP has many applications, including finding distribution chains to satisfy customer demand for an Internet enterprise.

38 Claims, 18 Drawing Sheets

METHODS FOR SOLVING THE TRAVELING SALESMAN PROBLEM

TECHNICAL FIELD

The present invention relates to computational models, simulation, and other techniques for solving complex problems in combinatorics and artificial intelligence and, in particular, it relates to methods for solving the Traveling Salesman Problem, which have a broad range of applications.

BACKGROUND

In the traditional Traveling Salesman Problem (TSP), a traveling salesman must visit customers in a number of cities and he knows the distance between pairs of cities he wants to visit. Since he is interested in not being too long on the road, he wants to take the shortest tour. FIG. 1 shows a number of cities to be visited in a traditional TSP. Suppose a traveling salesman must visit the following 8 capitol cities shown in FIG. 1: (a) Boise, Id.; (b) Salt Lake City, Utah; (c) Phoenix, Ariz.; (d) St. Paul, Minn.; (e) Columbus, Ohio; (f) Jefferson City, Mo.; (g) Richmond, Va.; and (h) Austin, Tex. FIG. 2 shows the shortest tour between the cities shown in FIG. 1 starting with a (Boise, Id.) and ending with a (Boise, Id.). The shortest tour is represented by the ordering a, b, c, h, f, g, e, d, which means he starts in city a (Boise, Id.), then goes to cities b, c, h, f, g, e, and d in that order (Salt Lake City, Utah to Phoenix, Ariz. to Austin, Tex. to Jefferson City, Mo. to Richmond, Va. to Columbus, Ohio to St. Paul, Minn.) and returning to city a (Boise, Id.). However, for various real-world applications of the TSP, there is a need for a modified solution to the TSP that starts and ends in different cities. FIG. 3 shows an alternate solution of the TSP shown in FIG. 1 in which the tour a, b, c, h, f, d, e, g begins and ends in different cities.

Furthermore, the tour shown in FIG. 2 is an idealized solution. FIG. 4 shows a more realistic example solution of the TSP than the example solution shown in FIG. 2. To travel by road would require a more roundabout path. For example, one would probably take highway 84 East from Boise, Id. to Salt Lake City, highways 15 South, 93 South and 40 East to Phoenix, Ariz., highways 17 North, 40 East, 287 South, and 35 South to Austin, Tex., back on highway 35 North to highways 75 North 69 North, 44 East, 73 North, and 54 North to Jefferson City, Mo., highways 54 North, 70 East, and 64 East to Richmond, Va., back on highway 64 West to highways 81 North and 70 West to Columbus, Ohio, highways 70 West, 65 North, 80 West, 39 North, 90 North, and 94 West to St. Paul, Minn. and highways 94 West, 15 South, 86 West, and 84 West back to Boise, Id. Also, extra time would be needed on slower roads, such as roads with construction or roads through large cities at rush hour. Travel by plane, boat, or train also has certain routes, congestion, and delays. There is a need for a solution to the TSP that takes into account the actual or realistic traveling distance, costs and time.

The TSP is an optimization problem, which is concerned with choosing the best among all possible arrangements, according to some criteria, such as distance, time, and traveling expenses. Therefore, it is not sufficient to find an arbitrary solution; instead one is interested in the best—or at least a very good—solution. However, it is not practical to enumerate all possible ordered paths for a large number of cities in order to determine the absolute best one. For a tour of n cities, the enumeration would have n! (n-factorial) ordered paths, where $n!=n\times(n-1)\times(n-2)\times \ldots \times 1$. The function n-factorial increases exponentially. For example, the enumeration of all possible paths for 8 cities is $8!=8\times7\times6\times5\times4\times3\times2\times1=40{,}320$. For 100 cities, the enumeration of all possible path is 100!, which is approximately $9.3\times10^{157}$ (which is "93" followed by 156 zeros). If a method enumerated one hundred million paths per second, i.e., at 100 MIPS, the speed of a typical PC, it would take approximately $2.9\times10^{144}$ years to enumerate all of them! ($2.9\times10^{144}$ years is approximately$=9.3\times10^{157}$ paths$\div$(1,000,000 paths/sec$\times$60 sec/min$\times$60 min/hr$\times$24 hr/day$\times$365 days/yr).) Clearly, there is a need to produce a result while we are still alive. The TSP has been called an NP-hard problem because no method exists for computing the solution in polynomial time. Polynomial time means a computer running time or an order of complexity of $O(n^k)$ or better, where k is a constant. There is a need for a method for solving the TSP in polynomial time.

Various methods have tried to solve the TSP. These methods can be broadly classified as heuristic methods, natural optimization techniques (such as linear programming, mixed integer programming, and quadratic programming), neural networks, and techniques based on Boltzman machines, such as simulated annealing. Heuristic and natural optimization techniques only give local optima rather than global optima, their order of complexity is O(n!) and they are unstable when a large number of cities are considered. Neural networks are dependent on a training methodology. Simulated annealing gives a solution, but in doing so it takes a lot of time or is slow at arriving at the solution for a large number of cities. There is a need for a method that gives a solution in less time for any number of cities, with complexity of O(n+k), where k is a constant.

For these and other reasons, there is a need for the present invention.

SUMMARY

The present invention is directed to several aspects of methods for solving the TSP including the use of a genetic algorithm. Different aspects of the present invention include a solution to the TSP that starts and ends in different cities, takes into account realistic traveling costs, and completes in polynomial time, such as O(n+k), where k is a constant.

One aspect of the present invention is a computer readable medium having computer-executable instructions for performing a method for solving a traveling salesman problem. According to the method, a set of locations to visit are selected. A starting point and an ending point from the set of locations is selected. Then, a search method using a genetic algorithm is applied to the set of locations and a route is provided as a solution to the traveling salesman problem. The genetic algorithm includes an objective function that simultaneously minimizes distance and time. The route is from the starting point to the ending point, visiting all locations in the set of locations. The objective function evaluated the route to a value that is lower than any other path searched. By simultaneously minimizing distance and time, the genetic algorithm takes into account realistic traveling costs and is better than evaluating distance alone.

Another aspect of the present invention is a computer readable medium having computer-executable instructions for performing a method for finding a route in a supply chain. Finding a route in a supply chain is an example of a solution to the TSP. According to the method, a set of orders are accessed. A set of supplier locations are selected to visit to pick up products to fill the set of orders. The method searches for pickup paths visiting each supplier location in the set of supplier locations. The searching is done by applying a genetic algorithm that simultaneously minimizes distance and time. The method provides a pickup route as a solution to the TSP. The pickup route comprises a pickup path that best simultaneously minimizes distance and time compared with all the other pickup paths searched. The genetic algorithm has an order of complexity of O(n+k), where k is a constant, so it completes in polynomial time.

Another aspect of the present invention is a method of searching among locations for paths. Searching among locations for paths is another example of a solution to the TSP. According to the method, an initial population of chromosomes is randomly generated to be a current population. A fitness for each chromosome in the current population is calculated. One or more pairs of parent chromosomes to generate a new population are selected. The pairs are crossed over to generate the new population. The offspring are mutated to modify the new population. The current population is made a previous population and the current population is replaced with the new population. New generations are formed by repeating the calculating, selecting, crossing over, mutating, and making acts, until a previous best fitness in the previous population is the same as a current best fitness in the current population. This method provides a path represented by a chromosome having a best fitness in the current population. Each chromosome holds a predetermined number of integers. One integer is located at each position in the chromosome. Each integer represents one location from a set of locations. The fitness represents distance and time simultaneously. The pairs of parent chromosomes are chosen from the current population based on their fitness. The pairs are crossed over at a randomly chosen point to form offspring. The crossover is carried out with a crossover probability $P_c$ between about 0.6 and 0.9. Mutation is done at each position on the chromosomes of the offspring. The mutation is carried out with a mutation probability $p_m$ between about 0.001 and 0.01.

Another aspect of the present invention is a computer system for finding distribution chains to satisfy customer demand. Finding distribution chains to satisfy customer demand is another solution to the TSP. The computer system comprises a storage device, an output device, and a processor programmed for repeatedly performing a method. According to the method, current orders are determined. A set of locations to visit which comprises locations of suppliers with products available for the current orders is determined. Also, a starting location in the set of locations and a distribution center proximate to customer locations are determined. A genetic algorithm is applied to find a first route while minimizing distance and time. The method provides the first route on the output device, stores any undelivered products in a buffer, and removes the orders that the first route will fill from the current orders. The customer locations are delivery locations for each customer who placed one of the current orders. The first route starts at the starting location, ends at the distribution center, and visits each location in the set of locations. The undelivered products are stored in the buffer on the storage device and will be included in the current orders during the next iteration of the method.

Another aspect of the present invention is a data signal having a data structure stored thereon, which comprises a first field containing locations and a second field containing a request for a route through the locations in the first field. Another aspect of the present invention is a data signal having a data structure stored thereon, which comprises a field containing a route which comprises ordered locations to be visited.

Another aspect of the present invention is a method of communication, comprising: receiving a plurality of locations and a request for a route through the locations, and sending, in response to the request, the route.

These and other features, aspects, and advantages of the present invention will become better understood with reference to the following description and appended claims.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The present invention is directed to various aspects of methods for solving the Traveling Salesman Problem (TSP). Novel methods for solving the TSP and example applications of the methods are described below. The following detailed description includes representing location information for a TSP as chromosomes. By representing or encoding location information as chromosomes, e.g. storing it in a chromosome data structure, methods may incorporate genetic algorithms. The methods for solving the TSP may be applied to a broad range of applications, such as supply chain management.

Figure 1:
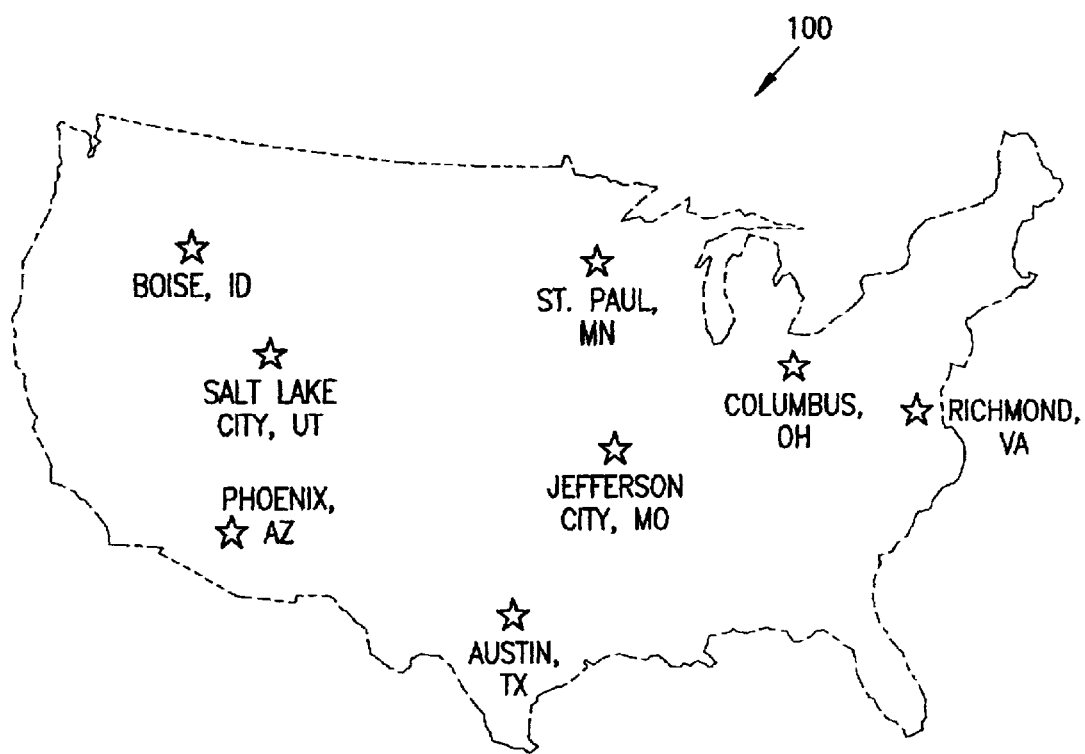
FIG. 1 shows a number of cities to be visited in a traditional Traveling Salesman Problem (TSP).
Figure 2:
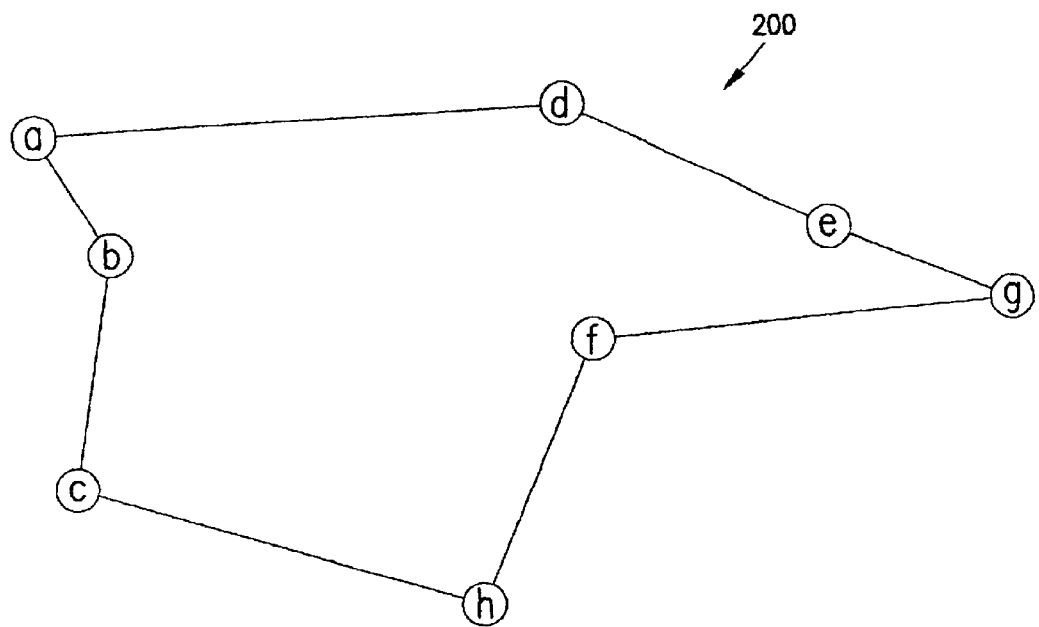
FIG. 2 shows an example solution of the TSP shown in FIG. 1 in which a tour begins and ends in the same city.
Figure 3:
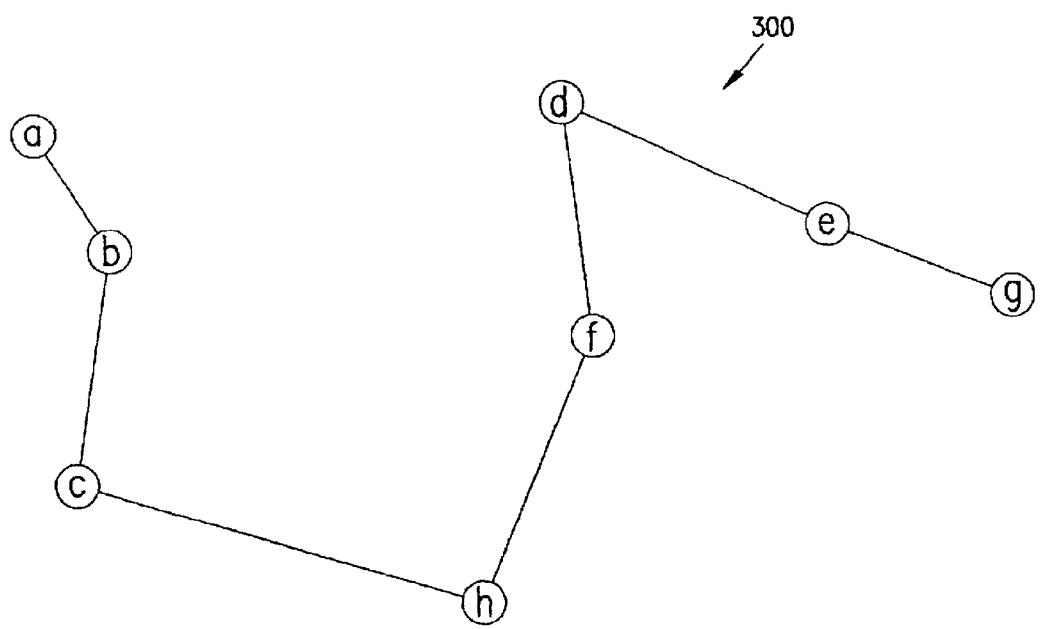
FIG. 3 shows an alternate solution of the TSP shown in FIG. 1 in which a tour begins and ends in different cities.
Figure 4:
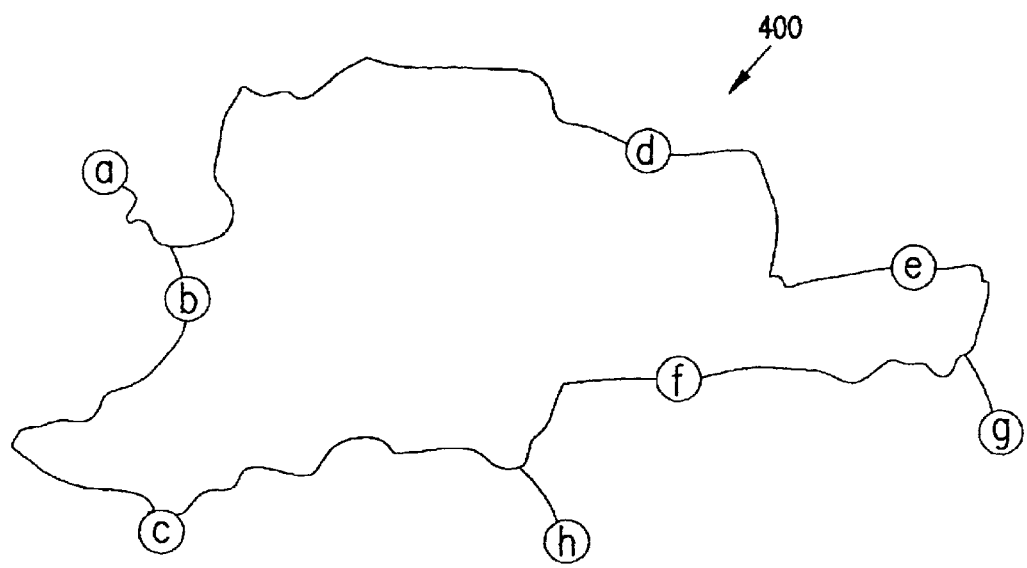
FIG. 4 shows a more realistic example solution of the TSP than the example solution shown in FIG. 2.
Figure 5:
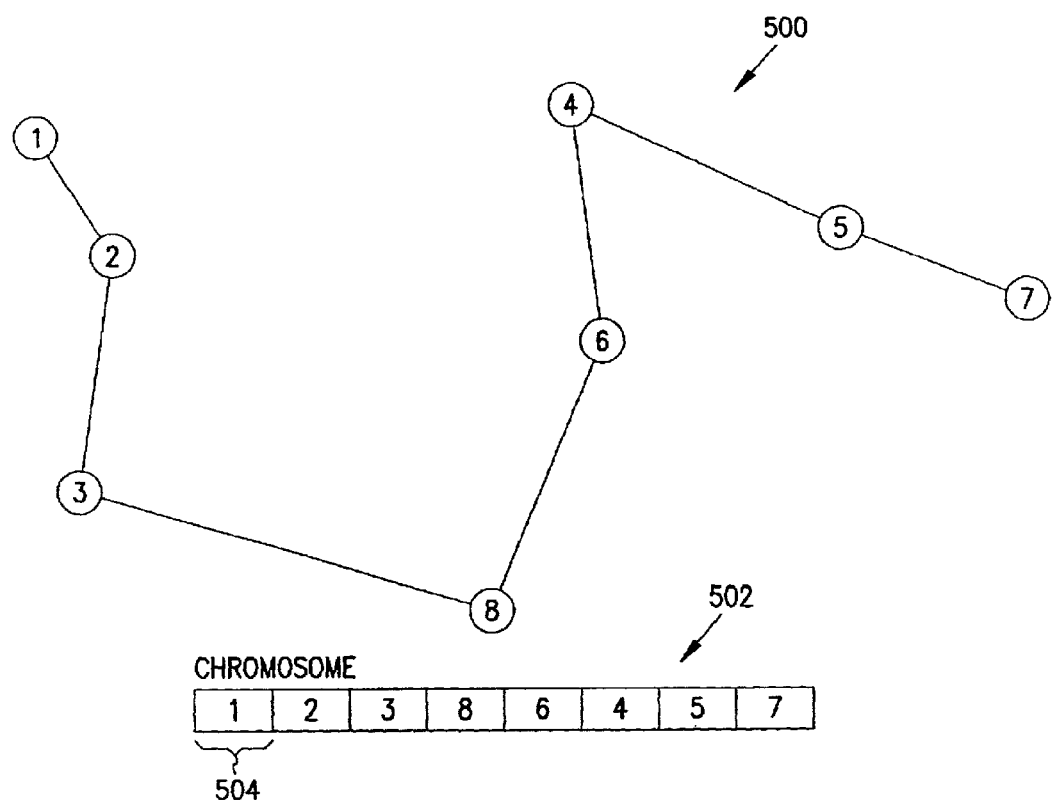
FIG. 5 shows an example solution of the TSP shown in FIG. 1 and an example encoding of the solution in a chromosome, according to embodiments of the present invention.

FIG. 5 shows an example solution 500 of the TSP shown in FIG. 1 and an example encoding of the solution in a chromosome, according to embodiments of the present invention. In FIG. 5, the eight cities of FIG. 1 are represented by the integers 1–8 as follows: (1) Boise, Id.; (2) Salt Lake City, Utah; (3) Phoenix, Ariz.; (4) St. Paul, Minn.; (5) Columbus, Ohio; (6) Jefferson City, Mo.; (7) Richmond, Va.; and (8) Austin, Tex. In other words, the letters, a, b, c, d, e, f, g, h in FIGS. 2–4 have been replaced by the integers 1, 2, 3, 4, 5, 6, 7, 8 in FIG. 5. The example solution 500 of the TSP, shown in FIG. 5, may also be written as the ordered path 1, 2, 3, 8, 6, 4, 5, 7, which represents a solution 500 of the TSP from (1) Boise, Id. to (2) Salt Lake City, Utah to (3) Phoenix, Ariz. to (8) Austin, Tex. to (6) Jefferson City, Mo. to (4) St. Paul, Minn. to (5) Columbus, Ohio to (7) Richmond, Va.

FIG. 5 also shows how the tour 500 may be represented in a chromosome data structure 502. A chromosome data structure 502 in a genetic algorithm refers to a candidate solution to the TSP. Some other candidate solutions to the TSP for 8 cities are {1, 4, 2, 3, 8, 6, 5, 7}, {2, 1, 6, 8, 3, 4, 5, 7}, {7, 8, 6, 5, 4, 3, 2, 1} and other permutations of the numbers 1–8. Once location information is encoded into a chromosome data structure, then methods including a genetic algorithm may be used to solve the TSP.

A genetic algorithm is an evolutionary computation method, which is an abstraction or model of biological evolution. In a genetic algorithm, candidate solutions are reproduced and evaluated for fitness in successive generations until a best solution is found using a kind of "natural selection" together with genetics-inspired operations like crossover or replication and mutation. In biology, each gene is located at a particular position on the chromosome. In a genetic algorithm solving the TSP, each city may be represented as an integer at a particular position in the chromosome data structure. For example, city (1) Boise, Id. is encoded in the first position 504 of the chromosome data structure 502. Each element of the solution 500, which is the ordered path 1, 2, 3, 8, 6, 4, 5, 7, is encoded into the chromosome data structure 502 in its corresponding position, i.e. the first element 1 is in the first position, the fourth element 8 is in the fourth position, etc.

Novel methods of solving the TSP will be described in detail below. These novel methods can be applied to a broad range of applications. One application that will benefit from the new methods for solving the TSP is supply chain management. Supply chain management includes timely distribution of goods to meet customer demand. A supply chain is a business process that enables customer demand for a product or service to be satisfied. Supply chain management decisions include logistics, production, inventory, transportation, and scheduling. A method to find solutions to the TSP aids or automates supply chain management decisions by, for example, generating cost effective distribution paths. One example of supply chain management is a web-based trading exchange or portal connecting buyers and sellers along the supply chain of the automotive industry. Customer demands for any automotive products in any amount from any part of the world need to be satisfied in time.

Figure 6A:
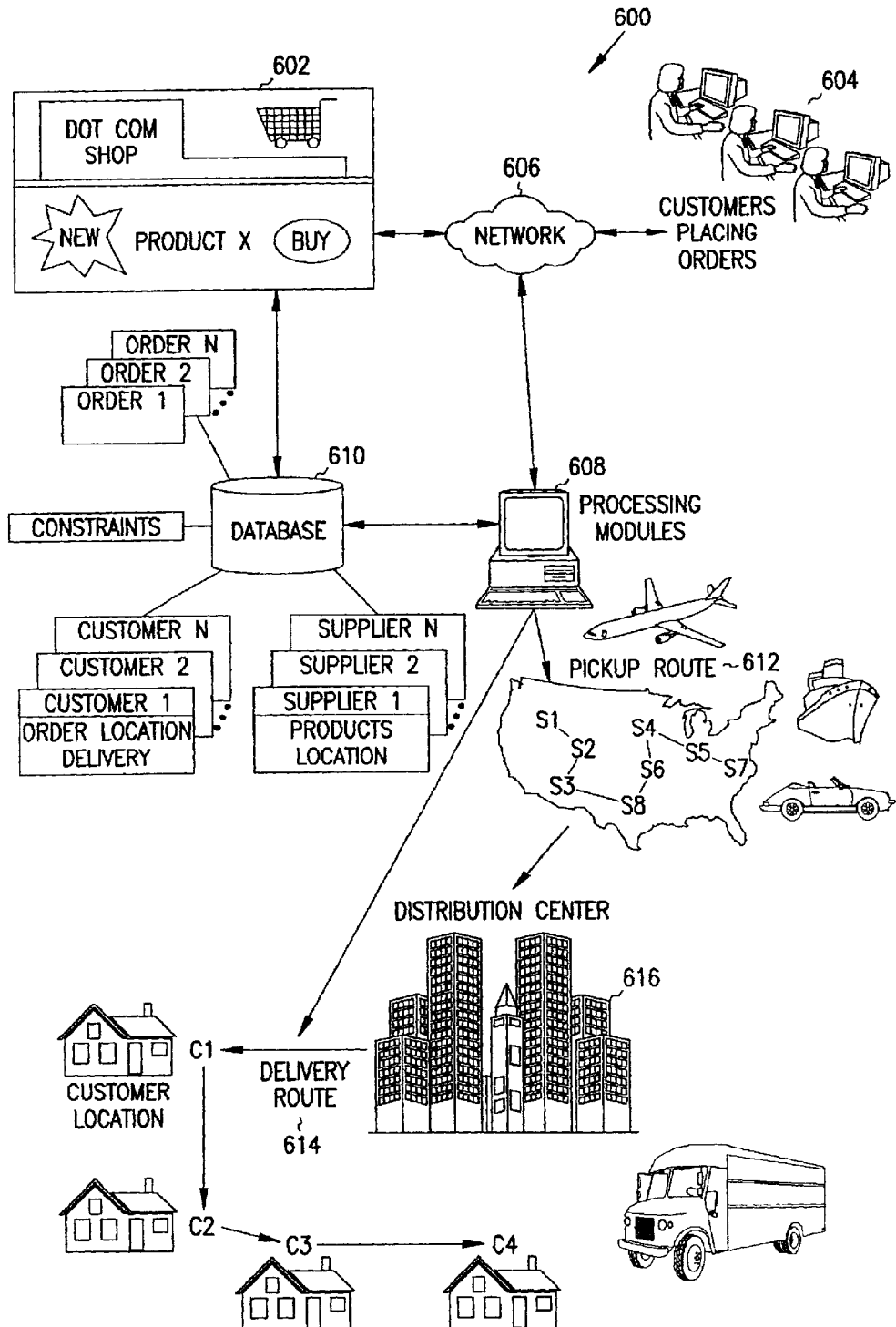
FIG. 6A shows an overview of an example embodiment of a method for solving the TSP applied to supply chain management, according to embodiments of the present invention.

FIG. 6A shows an overview of an example embodiment of a method for solving the TSP applied to supply chain management, according to embodiments of the present invention. One example of a supply chain management application is a typical "Dot Com Shop" operation 600 like the one shown in FIG. 6A. A "Dot Com Shop" 602 provides online ordering for customers 604 over a network 606. The network 606 may be a local area network (LAN), a wide area network (WAN), such as the Internet, an intranet, or any other kind of network, for example, a telephone network. A method of solving the TSP in the form of processing modules 608 running on a computing device receives the orders placed online by customers 604 from the "Dot Com Shop" 602, over the network 606, or from a database 610. Processing modules 608 are computer-executable instructions that perform methods and may be implemented in any software language or script or in hardware or firmware in the computing device.

However, there are many other applications of methods for solving the TSP besides supply chain management, including optimization tasks (e.g., numerical optimization, circuit layout, and job scheduling), automatic programming (e.g., sorting networks), machine learning (e.g., neural networks, symbolic production systems, and sensors for robots), economics (e.g., bidding strategies), immune system models, ecological models, population genetics, evolution and learning, and social systems (e.g., the evolution of cooperation and communication in multi-agent systems).

In FIG. 6A, the database 610 may be associated with or in communication with the computing device and may contain various kinds of information, such as order information, operational constraint information, customer information, supplier information, and other information. Order information comprises order identification numbers, customer name and address, delivery requirements, name of products, type of products, number of products, price of products, total price of order, and the like. Operational constraint information comprises customer preferences, supplier or warehouse policies and procedures, travel conditions, transportation requirements, equipment malfunctions, and the like. Customer information comprises name, address, delivery location, delivery requirements, order information and history, and the like. Supplier information is information concerning suppliers, such as manufacturing operations and warehouses. Supplier information comprises name, address, product availability, lines of products, and the like.

In FIG. 6A, the processing modules may produce solutions to the TSP based on input from the database in the form of pickup routes 612 and delivery routes 614. The routes may be for any kind of transportation, such as plane, ship, truck, or the like. A pickup route 612 is an ordered path, such as $S_1, S_2, S_3, S_8, S_6, S_4, S_5, S_7$, representing a plan to pickup products starting with $Supplier_1$ in Boise, Id., then to $Supplier_2$ in Salt Lake City, Utah, to $Supplier_3$ in Phoenix, Ariz., to $Supplier_8$ in Austin, Tex., to $Supplier_6$ in Jefferson City, Mo., to $Supplier_4$ in St. Paul, Minn., to $Supplier_5$ in Columbus, Ohio, and ending at $Supplier_7$ in Richmond, Va. The routes are not limited to the United States, but may be anywhere in the World. A delivery route 614 is an ordered path, such as $C_1, C_2, C_3, C_4$, representing a plan to deliver products to customers starting with $Customer_1$ to $Customer_2$ to $Customer_3$ and ending at $Customer_4$. The pickup route 612 and the delivery route 614 may be linked by a distribution center 616. The distribution center 616 may be at one of the suppliers or a separate location. The distribution center 616 is a place where products are shipped for local or regional delivery to a set of customers. For example, a distribution center may be located in a major metropolitan area and service customers throughout the metro area and the surrounding suburbs. Any shipping method may be used for delivery, such as vans, trucks, and the like.

Figure 6B:
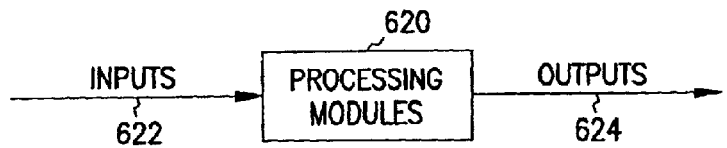
FIG. 6B shows a block diagram of a computerized system to implement methods for solving the TSP, as further described in FIGS. 7–18.

FIG. 6B shows a block diagram of a computerized system to implement methods for solving the TSP, as further described in FIGS. 7–18. As shown in FIG. 6B, the computerized system includes processing modules 620, inputs 622, and outputs 624. The general processing modules 620 in FIG. 6B correspond to the processing modules 608 running on a computing device in FIG. 6A. Various aspects and embodiments of the inputs 622 and outputs 624 will become clear with reference to the following description.

Figure 7:
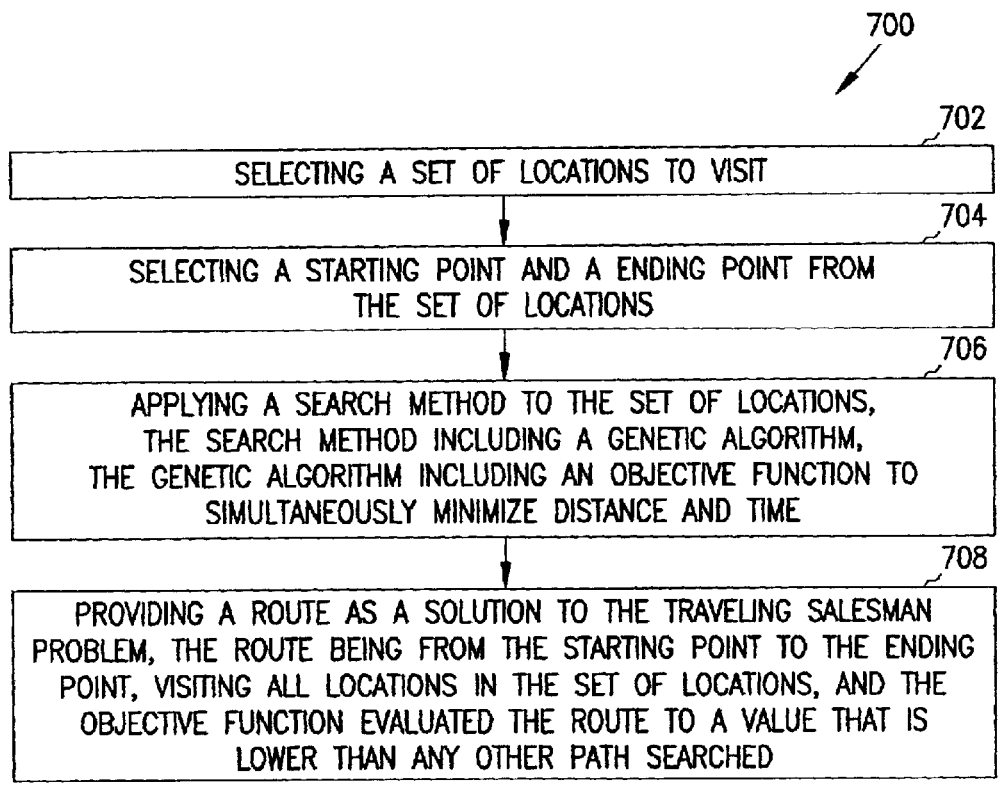
FIG. 7 shows a flow chart of an example embodiment of a method for solving the TSP to be implemented by the general processing modules of FIG. 6B.

FIG. 7 shows a flow chart of an example embodiment of a method 700 for solving the TSP to be implemented by the general processing modules of FIG. 6B. The method 700, shown in FIG. 7, may be implemented as processing modules 620, inputs 622, and outputs 624, as shown in FIG. 6B. The inputs 622 comprise a set of locations and the outputs 624 comprise a route as a solution to the TSP. Depending on the application, locations may be cities, locations of shippers, locations of warehouses, locations of manufacturers, locations on a circuit board, positions of a robot arm, and other kinds of locations. Similarly, a route may be an ordered list of cities, a design for a circuit board, a movement for a robot arm, and other kinds of routes.

As shown in FIG. 7, one aspect of the present invention is a computer readable medium having computer-executable instructions for performing a method 700 for solving a TSP. The method 700 comprises: selecting a set of locations to visit 702, selecting a starting point and an ending point from the set of locations 704, applying a search method to the set of locations 706, and providing a route as a solution to the TSP 708. The route is from the starting point to the ending point, visiting all locations in the set of locations.

Figure 12:
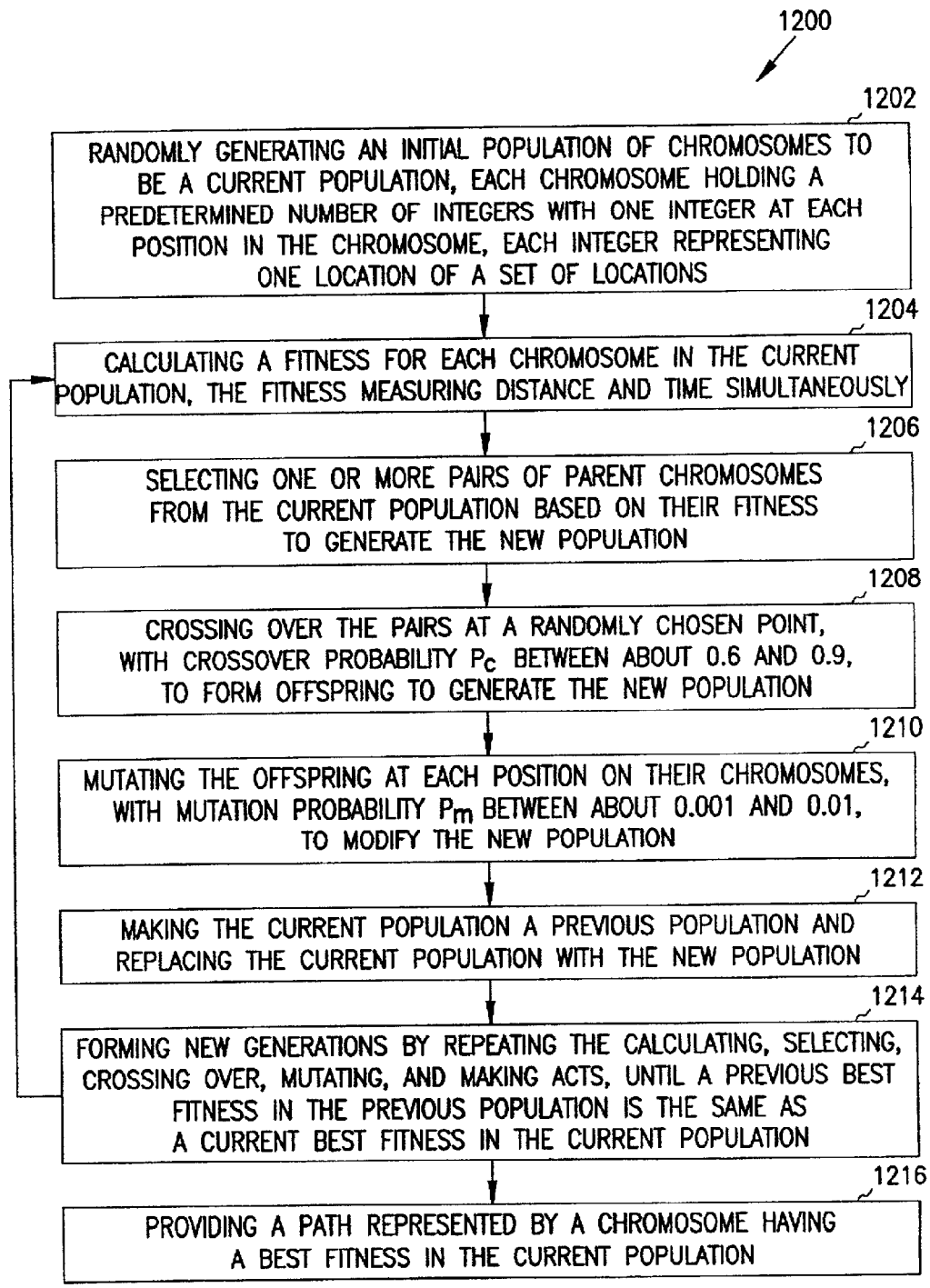
FIG. 12 shows a flow chart of an example embodiment of a method of searching among locations for paths to be implemented by the general processing modules of FIG. 6B.

An aspect of some embodiments of the present invention is that the search method includes a genetic algorithm. In one embodiment, the search method is a combinatoric approach to the genetic algorithm. One example embodiment of a search method including a genetic algorithm is shown in FIG. 12. The present invention, however, comprehends various other embodiments. Combinatorics includes a set of techniques for choosing, among all possible arrangements, that which is best according to some criteria, such as matching and covering.

An example genetic algorithm is shown in Table 1. Other example embodiments of a genetic algorithm may also be used in the present invention. The genetic algorithm includes an objective function to simultaneously minimize distance and time. The objective function would correspond to f(x) in Table 1. An objective function is used to evaluate the fitness of each path in the population according to some criteria, such as distance and time. A population is a set of paths or chromosomes generated by the genetic algorithm. The objective function evaluated the route, which was chosen as the solution to the TSP, to a value that is lower than any other path searched. In other words, the genetic algorithm evaluated each path in each generation and, of all the paths evaluated, the one with the best fitness was chosen as the solution to the TSP. This is because generally the fittest paths or chromosomes survive to replicate the next generation.

A genetic algorithm typically contains three operators: selection, crossover, and mutation, as illustrated in Table 1. Selection is an operator that selects chromosomes in the population for reproduction. The fitter the chromosome, the more times it is likely to be selected to reproduce. Crossover is an operator that randomly chooses a position on a chromosome and exchanges subsequences before and after the position between two chromosomes to create offspring. For example, the ordered paths 3, 2, 1, 4, 5, 6, 7, 8 and 1, 2, 3, 8, 6, 4, 5, 7 could be crossed over after the third position to produce the offspring 3, 2, 1, 8, 6, 4, 5, 7 and 1, 2, 3, 4, 5, 6, 7, 8. The crossover operator roughly mimics biological recombination between two single-chromosome organisms. Crossover is done with a probability such as 0.6. Mutation is an operator that randomly flips some of the positions in a chromosome. For example, the path 3, 2, 1, 4, 5, 6, 7, 8 might be mutated in its second and seventh positions to yield 3, 7, 1, 4, 5, 6, 2, 8. Mutation can occur at each position in a chromosome with some small probability, such as 0.001.

TABLE 1

An Example Genetic Algorithm

1. Start with a randomly generated population of n size chromosomes.
2. Calculate the fitness f(x) of each chromosome x in the population.
3. Repeat the following steps until n offspring have been created:
   a. Select one or more pairs of parent chromosomes from the current population, the probability of selection being an increasing function of fitness. Selection is done "with replacement" meaning that the same chromosome can be selected more than once to become a parent.
   b. With crossover probability $p_c$, cross over the pairs at a randomly chosen point to form two offspring. If no crossover takes place, form two offspring that are exact copies of their respective parents.
   c. Mutate the two offspring at each position with mutation probability $p_m$, and place the resulting chromosomes in the new population. If n is odd, one new population member can be discarded at random.
4. Replace the current population with the new population.
5. Go to step 2.

Figure 8:
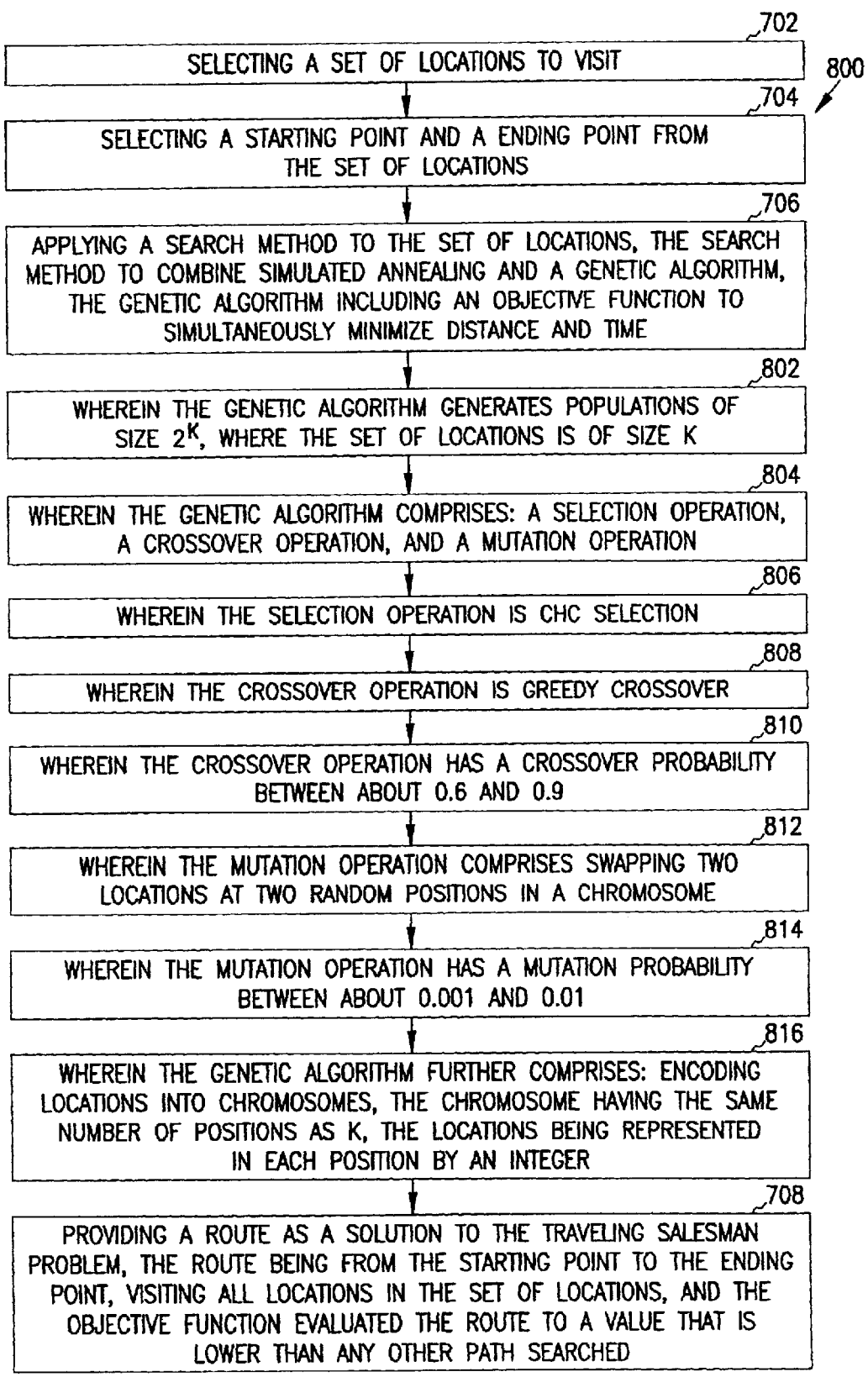
FIG. 8 shows a more detailed flow chart of alternate embodiments of the method for solving the TSP of FIG. 7.

FIG. 8 shows a more detailed flow chart of alternate embodiments 800 of the method 700 for solving the TSP of FIG. 7. In one embodiment of the method 700, the genetic algorithm generates populations of size $2^k$, where the set of locations is of size k 802. In another embodiment, the genetic algorithm comprises a selection operation, a crossover operation, and a mutation operation 804. In another embodiment, the selection operation is CHC selection 806.

CHC selection is characterized by elitist selection, incest prevention, a highly disruptive form of crossover, and restarts. Elitist selection is like survival of the fittest. Elitist selection involves cross-generational competition by merging parent populations and child populations and then ranking then according to fitness. The parent populations are created by selecting a predetermined number of the fittest members of a population. Incest prevention is a way to slow convergence to a solution by not mating parents that are too similar, such as parents with a difference threshold of a Hamming distance of $\frac{1}{4}^{th}$ the number of locations to visit in the route and by decreasing the difference threshold if no children can be created. Restarts prevent premature convergence by reintroducing diversity when a population is nearly converged. This is done by performing a mutation operation. In another embodiment, the crossover operation is greedy crossover 808. Greedy crossover is characterized by always choosing a location in the parent chromosome for the next position in an offspring chromosome that is closest to the location in the previous position in the offspring chromosome, if such a location exists. It is greedy in the sense of attempting to minimize distance. In another embodiment, the crossover operation has a crossover probability between about 0.6 and 0.9 810. In another embodiment, the mutation operation comprises swapping two locations at two random positions in a chromosome 812. In another embodiment, the mutation operation has a mutation probability between about 0.001 and 0.01 814. In another embodiment, the genetic algorithm further comprises: encoding locations into chromosomes so that the chromosomes have the same number of positions as k and the locations are represented in each position by an integer 816. Locations may also be represented by bits (e.g. 01000111) or characters, such as a, b, c, d, e, f, g, h in the present invention.

Figure 9:
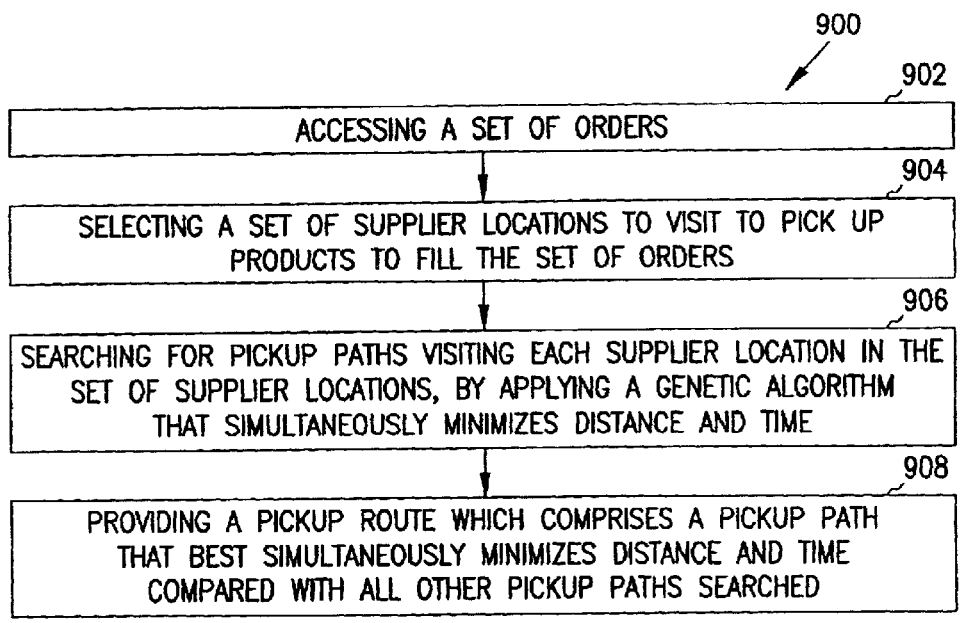
FIG. 9 shows a flow chart of an example embodiment of a method for finding a route in a supply chain to be implemented by the general processing modules of FIG. 6B.

Novel methods for solving the TSP have been described by reference to FIGS. 7 and 8. As described earlier, solutions to the TSP may be applied to supply chain management. FIG. 9 shows a flow chart of an example embodiment of a method for finding a route in a supply chain to be implemented by the general processing modules of FIG. 6B. The method 900, shown in FIG. 9, may be implemented as processing modules 620, inputs 622, and outputs 624, as shown in FIG. 6B. The inputs 622 comprise a set of orders and a set of supplier locations to visit and the outputs 624 comprise a pickup route. One aspect of the present invention is a computer readable medium having computer-executable instructions for performing a method for finding a route in a supply chain 900. The method 900 comprises: accessing a set of orders 902, selecting a set of supplier locations to visit to pick up products to fill the set of orders 904, searching for pickup paths visiting each supplier location in the set of supplier locations, by applying a genetic algorithm that simultaneously minimizes distance and time 906, and providing a pickup route which comprises a pickup path that best simultaneously minimizes distance and time compared with all the other pickup paths searched 908.

Figure 10:
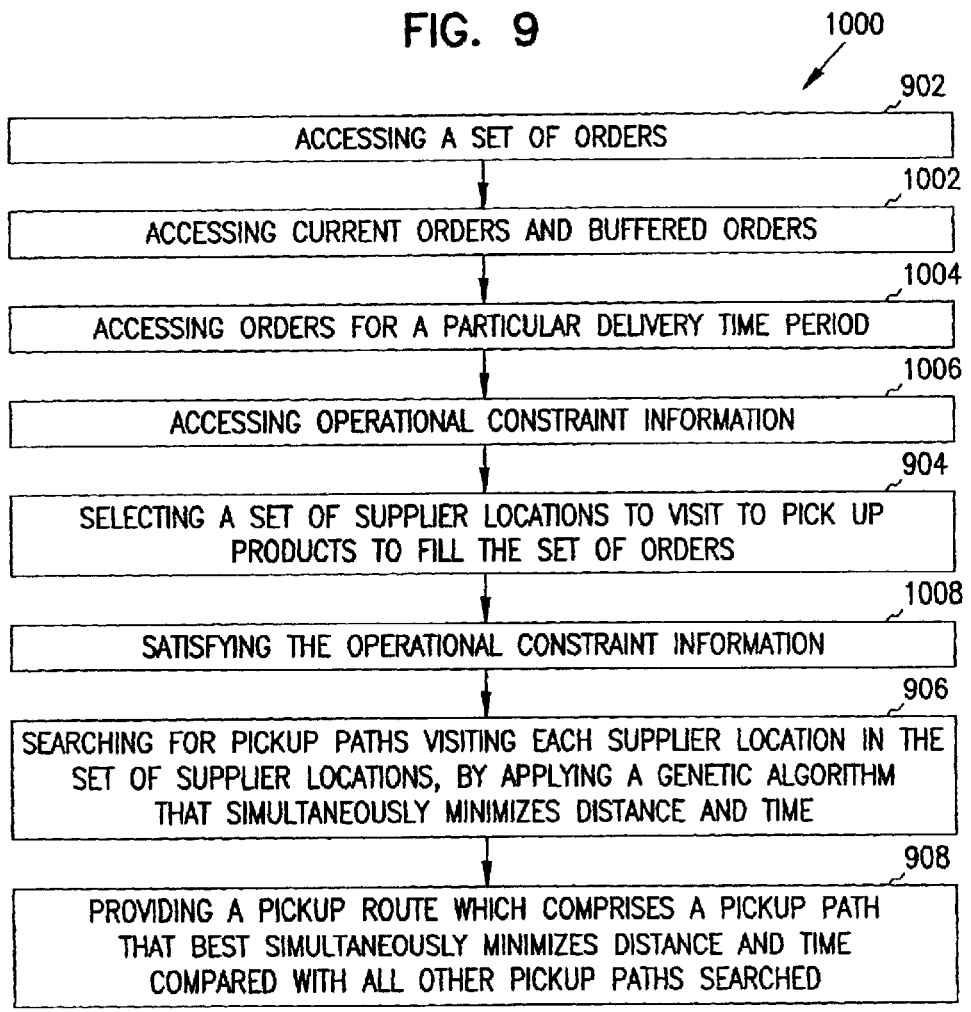
FIG. 10 shows a more detailed flow chart of alternate embodiments of the method for finding a route in a supply chain of FIG. 9.

FIG. 10 shows a more detailed flow chart of alternate embodiments 1000 of the method 900 for finding a route in a supply chain of FIG. 9. In one embodiment, accessing a set of orders 902 further comprises accessing current orders and buffered orders 1002. Orders that cannot be delivered in the current route are stored in a buffer so that they can be delivered in a later route. For example, orders may not be able to be filled due to products not being available by any supplier until a later date. Also, orders may be continuously be placed by customers while the method 900 is run only periodically. In that case, orders placed between runs will be buffered. In another embodiment, accessing a set of orders 902 further comprises accessing orders for a particular delivery time period 1004. In another embodiment, the method 900 further comprises accessing operational constraint information 1006. In another embodiment, the method 900 further comprises satisfying the operational constraint information 1008.

Figure 11A:
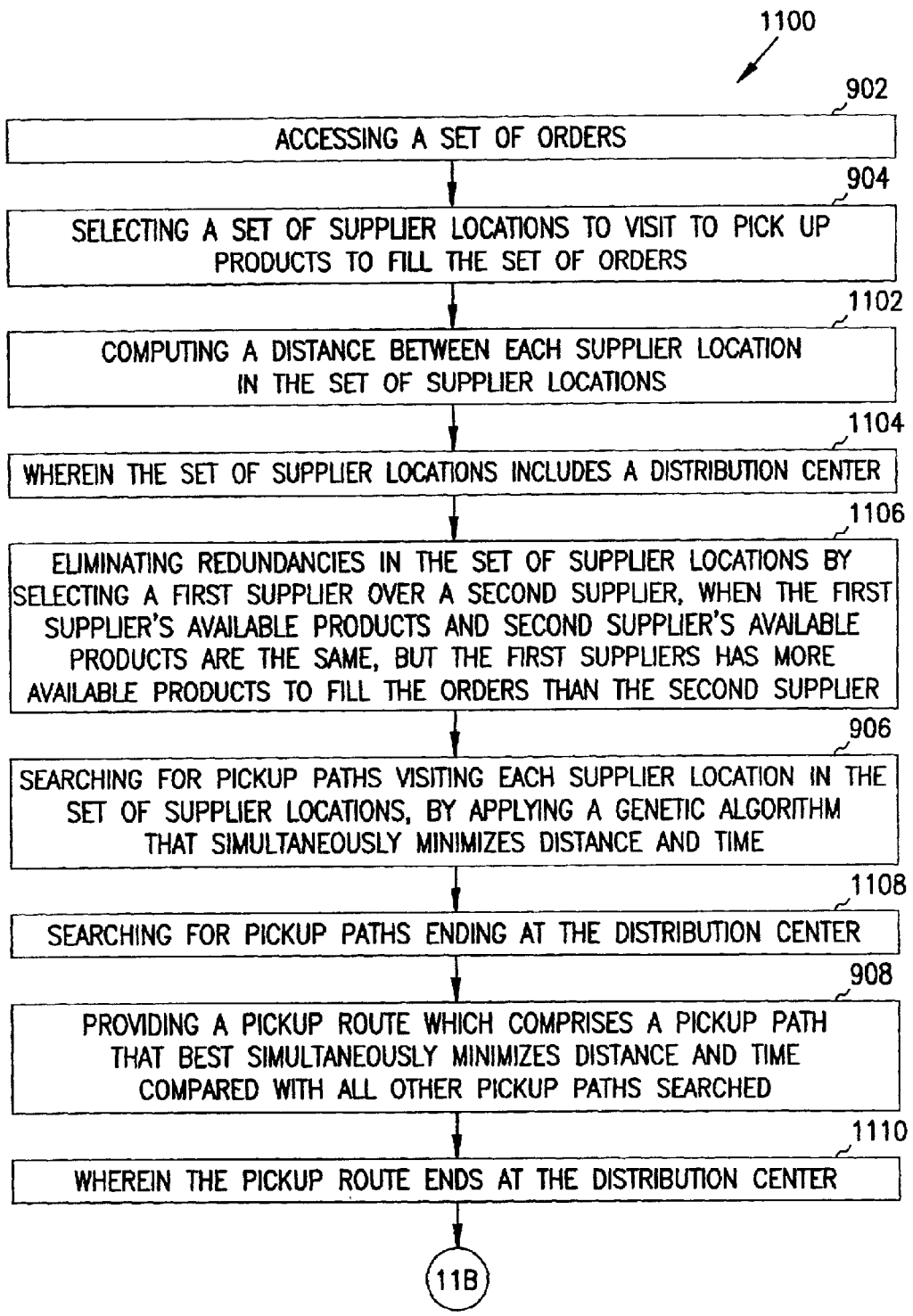
FIG. 11 shows another more detailed flow chart of alternate embodiments of the method for finding a route in a supply chain of FIG. 9.
Figure 11B:
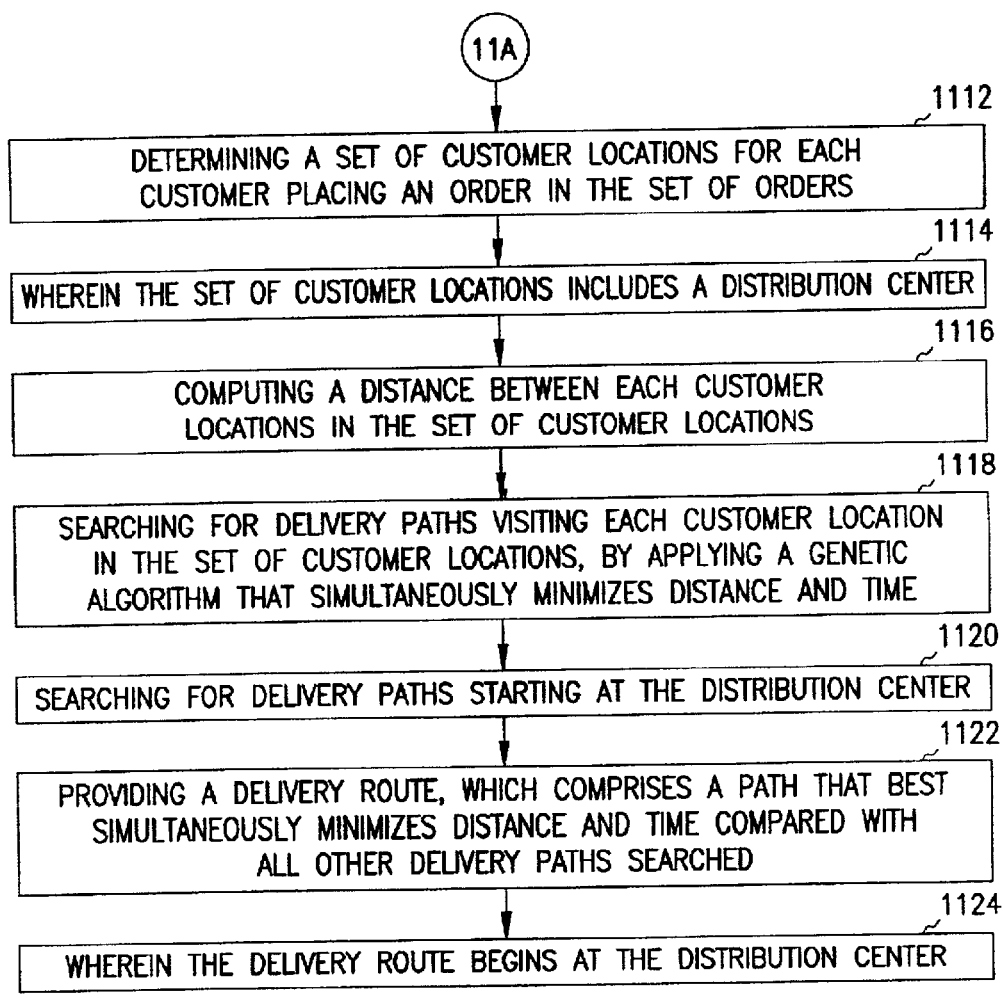

FIG. 11 shows another more detailed flow chart of alternate embodiments of the method for finding a route in a supply chain of FIG. 9. In one embodiment, selecting a set of supplier locations to visit to pick up products to fill the set of orders 904 further comprises computing a distance between each supplier location in the set of supplier locations 1102. In another embodiment, the set of supplier locations includes a distribution center 1104. In another embodiment, selecting a set of supplier locations to visit to pick up products to fill the set of orders 904 further comprises eliminating redundancies in the set of supplier locations by selecting a first supplier over a second supplier, when the first supplier's available products and second supplier's available products are the same, but the first supplier has more available products to fill the orders than the second supplier 1106. For example, the method 900 may check whether a particular product is available at only one or many suppliers. If it is available at only one supplier, then that supplier is selected. Otherwise, the supplier that can supply the largest number of those products is selected. In another embodiment, searching for pickup paths 906 further comprises searching for pickup paths ending at the distribution center 1108. In another embodiment, the pickup route provided in 908 is a pickup route that ends at the distribution center 1110. In another embodiment, the method 900 further comprises determining a set of customer locations for each customer placing an order in the set of orders. In another embodiment, the set of customer locations includes a distribution center 1114. In another embodiment, the method 900 further comprises computing a distance between each customer location in the set of customer locations 1116. In another embodiment, the method 900 further comprises searching for delivery paths visiting each customer location in the set of customer locations, by applying a genetic algorithm that simultaneously minimizes distance and time 1118. In another embodiment, searching for delivery paths includes searching for delivery paths starting at the distribution center 1120. In another embodiment, the method 900 further comprises providing a delivery route, which comprises a path that best simultaneously minimizes distance and time compared with all the other delivery paths searched 1122. In another embodiment, the delivery route begins at the distribution center 1124.

FIG. 12 shows a flow chart of an example embodiment of a method of searching among locations for paths to be implemented by the general processing modules of FIG. 6B. One aspect of the present invention is a method of searching among locations for paths 1200. According to some embodiments of the present invention, the locations are encoded as a chromosome data structure. The method 1200 comprises: randomly generating an initial population of chromosomes to be a current population, each chromosome holding a predetermined number of integers with one integer at each position in the chromosome, each integer representing one location from a set of locations 1202, calculating a fitness for each chromosome in the current population, the fitness representing distance and time simultaneously 1204, selecting one or more pairs of parent chromosomes from the current population based on their fitness to generate a new population 1206, crossing over the pairs at a randomly chosen point, with crossover probability $p_c$ between about 0.6 and 0.9, to form offspring to generate the new population 1208, mutating the offspring at each position on their chromosomes, with mutation probability $p_m$ between about 0.001 and 0.01, to modify the new population 1210, making the current population a previous population and replacing the current population with the new population 1212, forming new generations by repeating the calculating, selecting, crossing over, mutating, and making acts, until a previous best fitness in the previous population is the same as a current best fitness in the current population 1214 and providing a path represented by a chromosome having a best fitness in the current population 1216.

An example of a randomly generated initial population of chromosomes representing ordered paths through locations 1–8 is shown in Table 2.

TABLE 2

An Example of A Randomly Generated Initial Population 3 5 7 8 2 1 4 6
4 3 8 2 7 5 6 1
6 8 3 4 5 7 2 1
7 4 2 3 6 8 1 5
. . .
2 1 5 4 8 6 3 7

An example of calculated fitness values for each chromosome in the population of Table 2 is shown in Table 3.

TABLE 3

An Example of Calculated Fitness Values

| Chromosome | Fitness Value |
|---|---|
| 3 5 7 8 2 1 4 6 | 144 |
| 4 3 8 2 7 5 6 1 | 63 |
| 6 8 3 4 5 7 2 1 | 151 |
| 7 4 2 3 6 8 1 5 | 72 |
| . . . | . . . |
| 2 1 5 4 8 6 3 7 | 185 |

An example of selecting a pair of parent chromosomes from the population of Table 3 based on their fitness might be to select 4 3 8 2 7 5 6 1, with a fitness of 63 and 7 4 2 3 6 8 1 5 with a fitness of 72, supposing that 63 and 72 are the lowest fitness values of all the chromosomes in the population (even those not shown) and that a low fitness value is better. Alternatively, the fitness values could be maximized—it depends on what the fitness measures and the objective of the method. An example objective is to find a route through the locations that travels the minimum distance in the shortest time. An example of crossing over the pair, 4 3 8 2 7 5 6 1 and 7 4 2 3 6 8 1 5, at a randomly chosen point, the third position, to form offspring is shown in Table 4. To maintain a legal tour, i.e. an ordered sequence having no repeated numbers, the crossover operation may not reproduce a location in a child that is already in the child. For example, crossing over 4 3 8 2 7 5 6 1 with 7 4 2 3 6 8 15 at the third position would create 4 3 8 3 6 8 1 5, if you started with 4 3 8 from the first parent and ended with 3 6 8 1 5 from the second parent. But 4 3 8 3 6 8 1 5 has duplicates of 3 and 8. In Table 4, rather than inserting duplicates, random numbers between 1-8 that do not already appear in the child are inserted in their place. In some embodiments, the starting point and ending point are unaltered in each iteration, e.g. the starting point may be close to the current location of transportation and the ending point may be close to a sorting location. These duplicates are shown as boxes and the inserted numbers are shown underlined in Table 4.

TABLE 4

An Example of Crossing over 4 3 8 2 7 5 6 1        7 4 2 3 6 8 1 5
4 3 8 □ 6 □ 1 5
7 4 2 □ □ 5 6 1
4 3 8 2 6 <u>7</u> 1 5
4 3 8 <u>7</u> 6 2 1 5
7 4 2 <u>3</u> 8 5 6 1
7 4 2 <u>8</u> <u>3</u> 5 6 1

An example of mutating offspring at each position on their chromosomes, with mutation probability $p_m$ between about 0.001 and 0.01 is no mutation at all. Alternatively, one or more chromosomes could be mutated at one or more positions while maintaining a legal tour. For example, 4 3 8 2 6 7 1 5 could be mutated to 4 8 3 2 6 7 1 5, where 3 and 8 have been swapped and third positions. An example of a series of generations is shown in Table 5. In this example, the fitness values converged to paths starting with 4 3 8 and fitness values between 34 and 40 by generation 3, with the best route being 4 3 8 2 6 7 1 5, with a fitness of 34. If the method stopped with generation 3, since the best fitness, 34, was found in both generation 2 and generation 3, then the solution route would be 4 3 8 2 6 7 1 5.

TABLE 5

An Example A Series of Generations

| | Fitness Values |
|---|---|
| Generation 1 | |
| 3 5 7 8 2 1 4 6 | 144 |
| 4 3 8 2 7 5 6 1 | 63 |
| 6 8 3 4 5 7 2 1 | 151 |
| 7 4 2 3 6 8 1 5 | 72 |
| 2 1 5 4 8 6 3 7 | 185 |
| Generation 2 | |
| 4 3 8 2 6 7 1 5 | 34 |
| 4 3 8 7 6 2 1 5 | 65 |
| 7 4 2 3 8 5 6 1 | 71 |
| 7 4 2 8 3 5 6 1 | 73 |
| Generation 3 | |
| 4 3 8 2 6 7 1 5 | 34 |
| 4 3 8 2 7 6 1 5 | 32 |
| 4 3 8 2 7 6 5 1 | 40 |

Figure 13A:
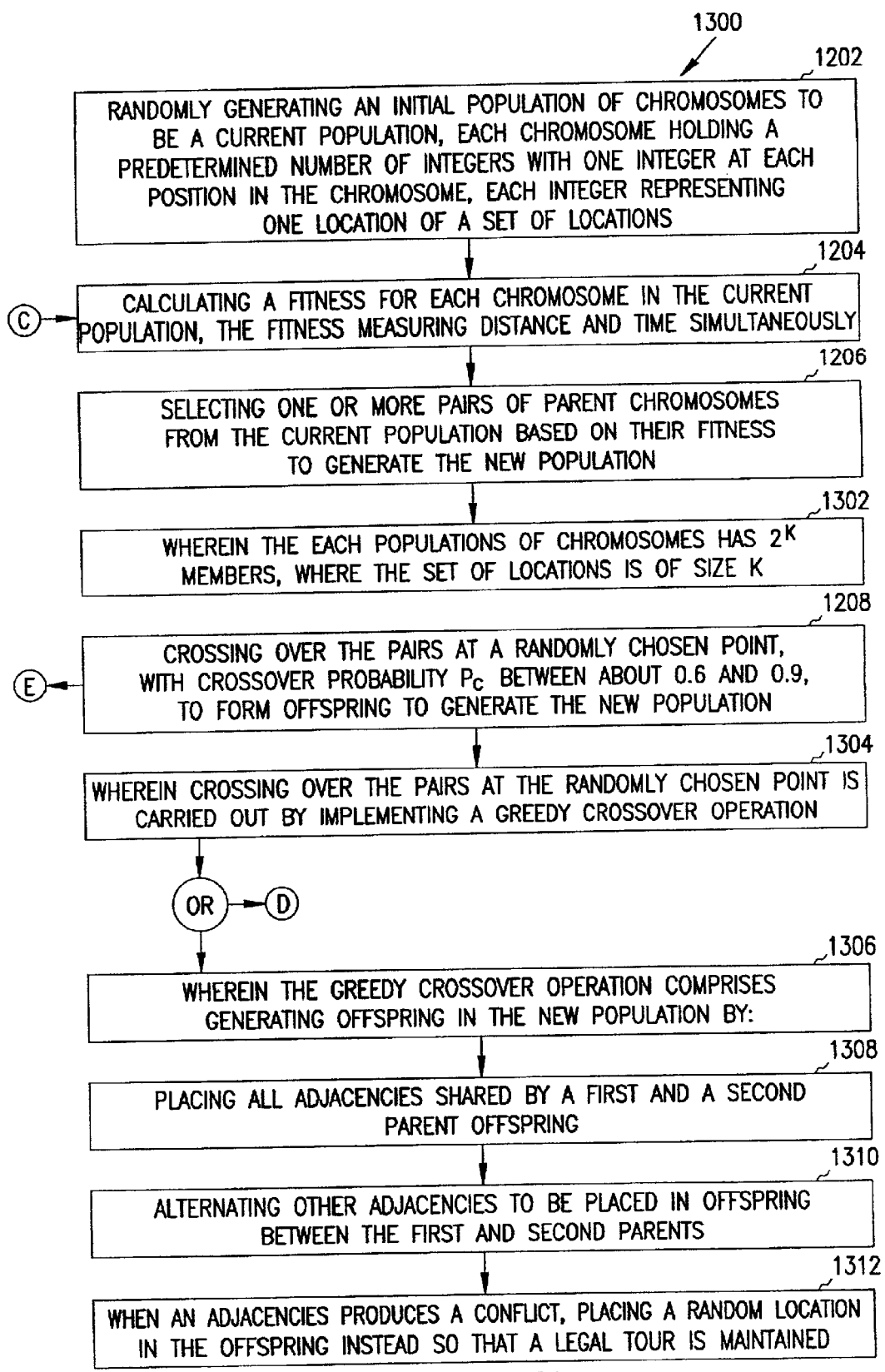
FIG. 13 shows a more detailed flow chart of alternate embodiments of the method of searching among locations for paths of FIG. 12.
Figure 13B:
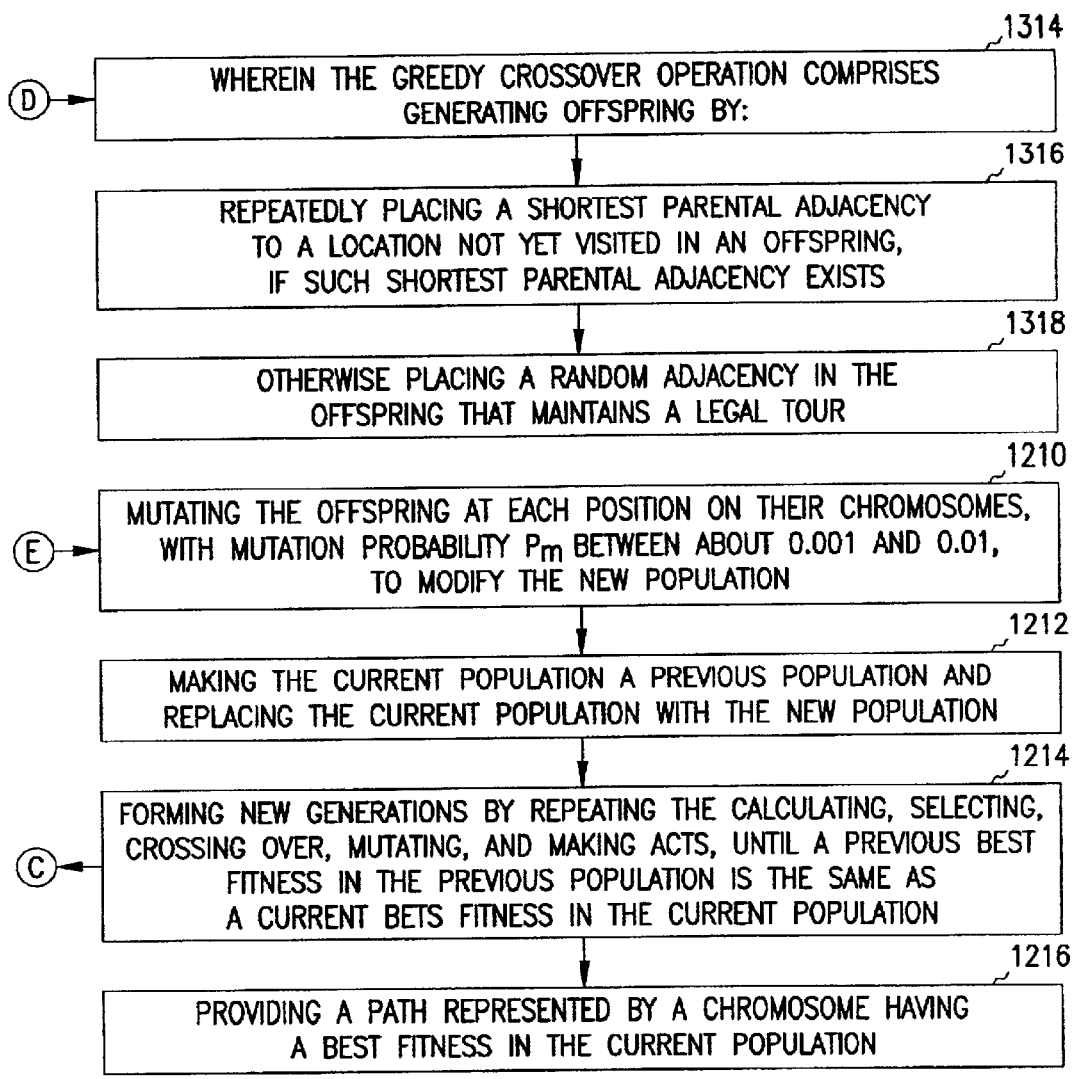

FIGS. 13A and 13B show a more detailed flow chart of alternate embodiments 1300 of the method 1200 of searching among locations for paths of FIG. 12. In one embodiment, each population of chromosomes has $2^k$ members, where the set of locations is of size k. In another embodiment, crossing over the pairs at the randomly chosen point 1208 is carried out by implementing a greedy crossover operation 1304. In another embodiment, the greedy crossover operation comprises generating offspring in the new population by 1306: placing all adjacencies shared by a first and a second parent in offspring 1308, alternating other adjacencies to be placed in offspring between the first and second parents 1310, and, when an adjacency produces a conflict, placing a random location in the offspring instead so that a legal tour is maintained 1312. In an alternate embodiment, the greedy crossover operation comprises generating offspring by 1314: repeatedly placing a shortest parental adjacency to a location not yet visited in an offspring, if such shortest parental adjacency exists 1316, otherwise placing a random adjacency in the offspring that maintains a legal tour 1318. An adjacency is the relationship of two locations next to each other in a chromosome, and in the real world, an adjacency represents a path, such as a road, between the locations, such as cities. For example, in the path a, b, c, h, f, d, e, g, locations c and h are adjacent. Also, h and f are adjacent.

Figure 14A:
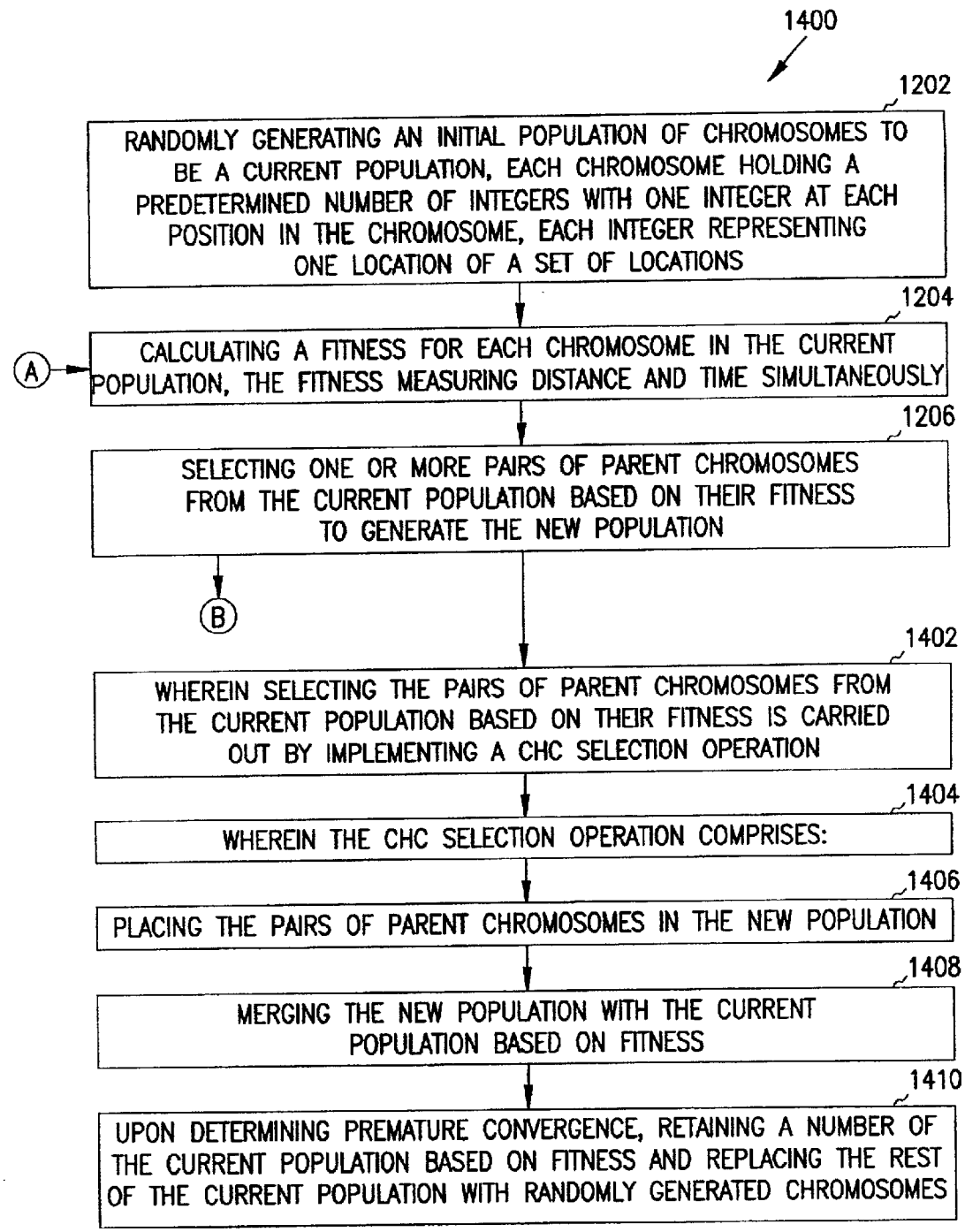
FIG. 14 shows another more detailed flow chart of alternate embodiments of the method of searching among locations for paths of FIG. 12.
Figure 14B:
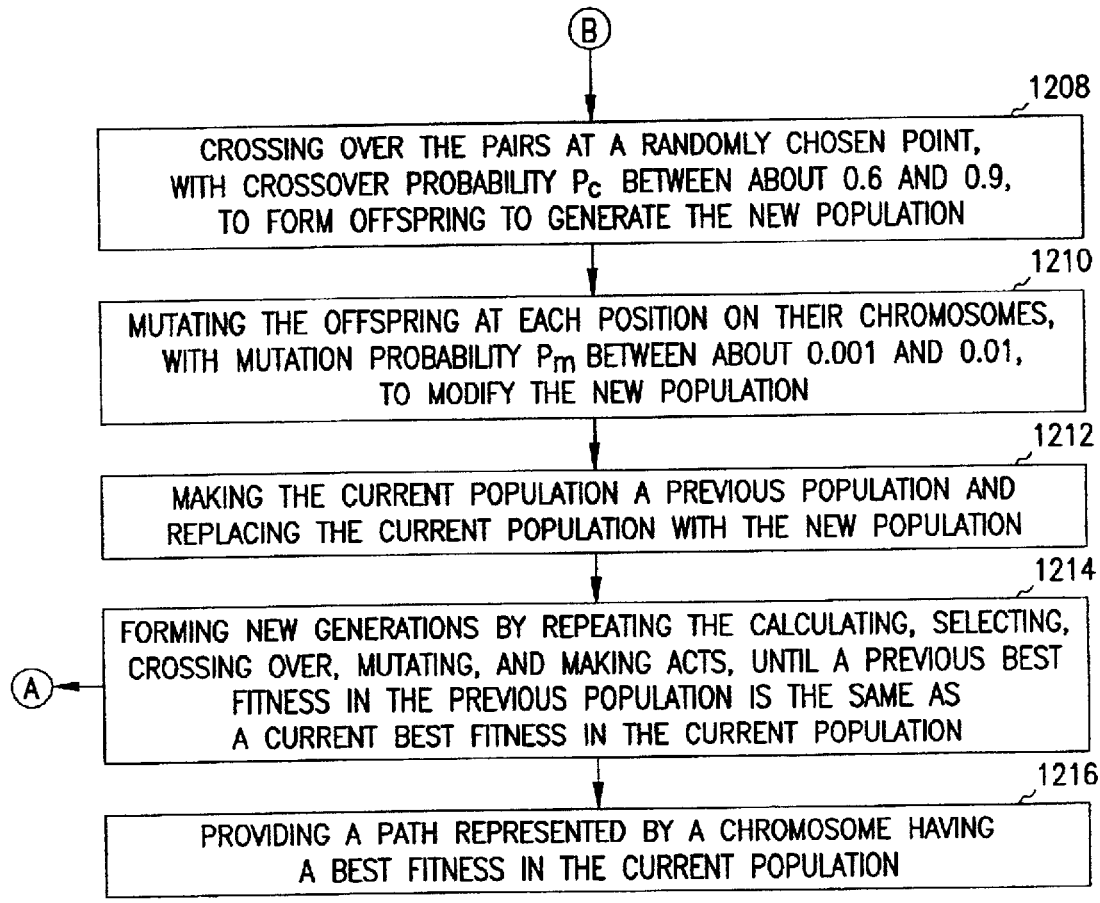

FIG. 14 shows another more detailed flow chart of alternate embodiments of the method of searching among locations for paths of FIG. 12. In one embodiment, selecting the pairs of parent chromosome from the current population based on their fitness 1206 is carried out by implementing a CHC selection operation 1402. In another embodiment, the CHC selection operation comprises 1404: placing the pairs of parent chromosomes in the new population 1406, merging the new population with the current population based on fitness 1408, and, upon determining premature convergence, retaining a number of the current population based on fitness and replacing the rest of the current population with randomly generated chromosomes 1410. Premature convergence occurs when relatively few generations are created before the fitness doesn't get much better in the next generation and the paths are very similar or identical with similar or identical fitness values.

Figure 15:
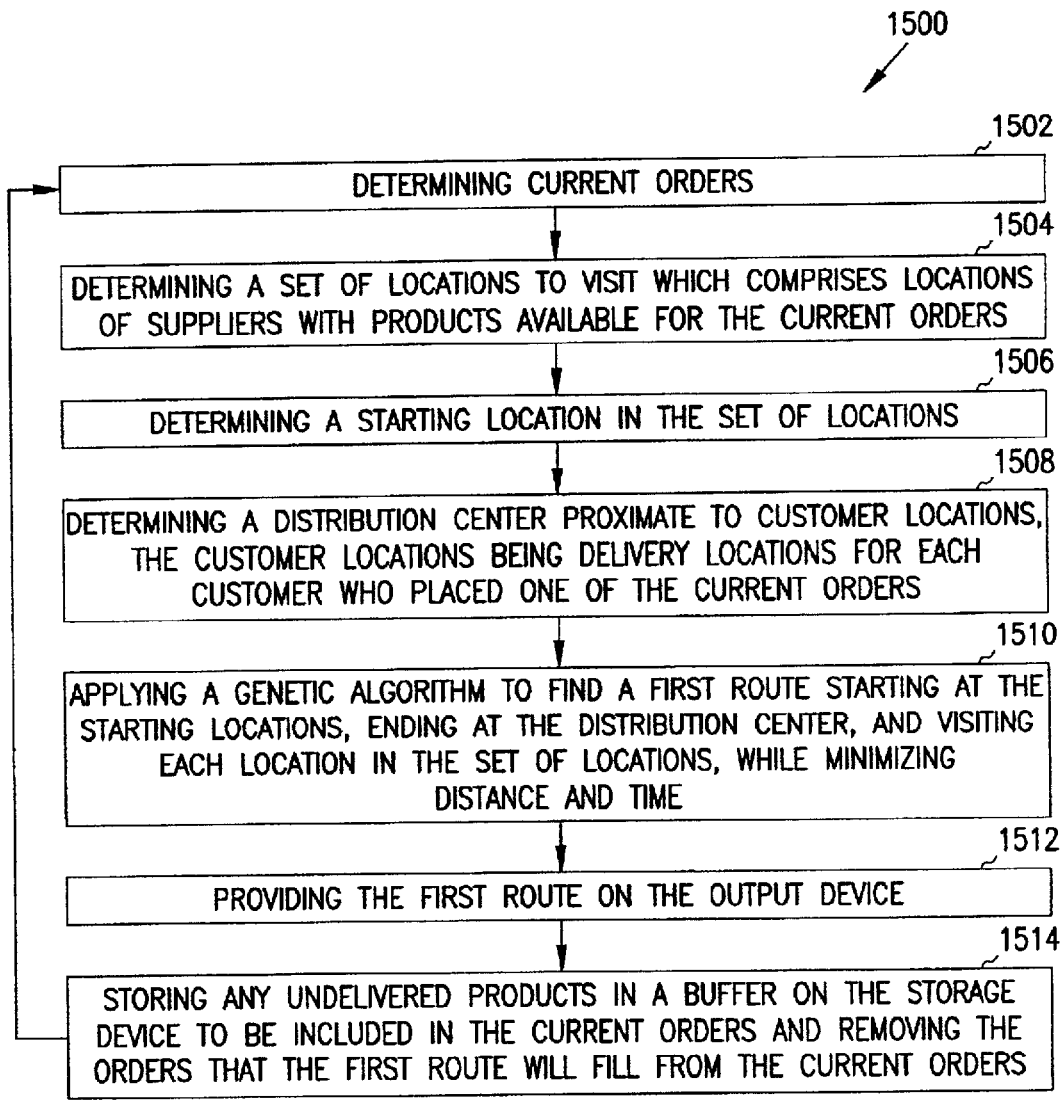
FIG. 15 shows a flow chart of an example embodiment of a method for finding distribution chains to satisfy customer demand to be programmed on a processor in a computer system.

FIG. 15 is another example embodiment of a method for solving a TSP. FIG. 15 shows a flow chart of an example embodiment of a method 1500 for finding distribution chains, which are one part of a supply chain to satisfy customer demand to be programmed on a processor in a computer system. One aspect of the present invention is a computer system for finding distribution chains to satisfy customer demand, comprising: a storage device, an output device, and a processor programmed for repeatedly performing a method 1500. The computer system may be similar to the one shown in FIG. 19. The method 1500 comprises: determining current orders 1502, determining a set of locations to visit which comprises locations of suppliers with products available for the current orders 1504, determining a starting location in the set of locations 1506, determining a distribution center proximate to customer locations, the customer locations being delivery locations for each customer who placed one of the current orders 1508, applying a genetic algorithm to find a first route starting at the starting location, ending at the distribution center, and visiting each location in the set of locations, while minimizing distance and time 1510, providing the first route on the output device 1512, and storing any undelivered products in a buffer on the storage device to be included in the current orders and removing the orders that the first route will fill from the current orders 1514.

Figure 16:
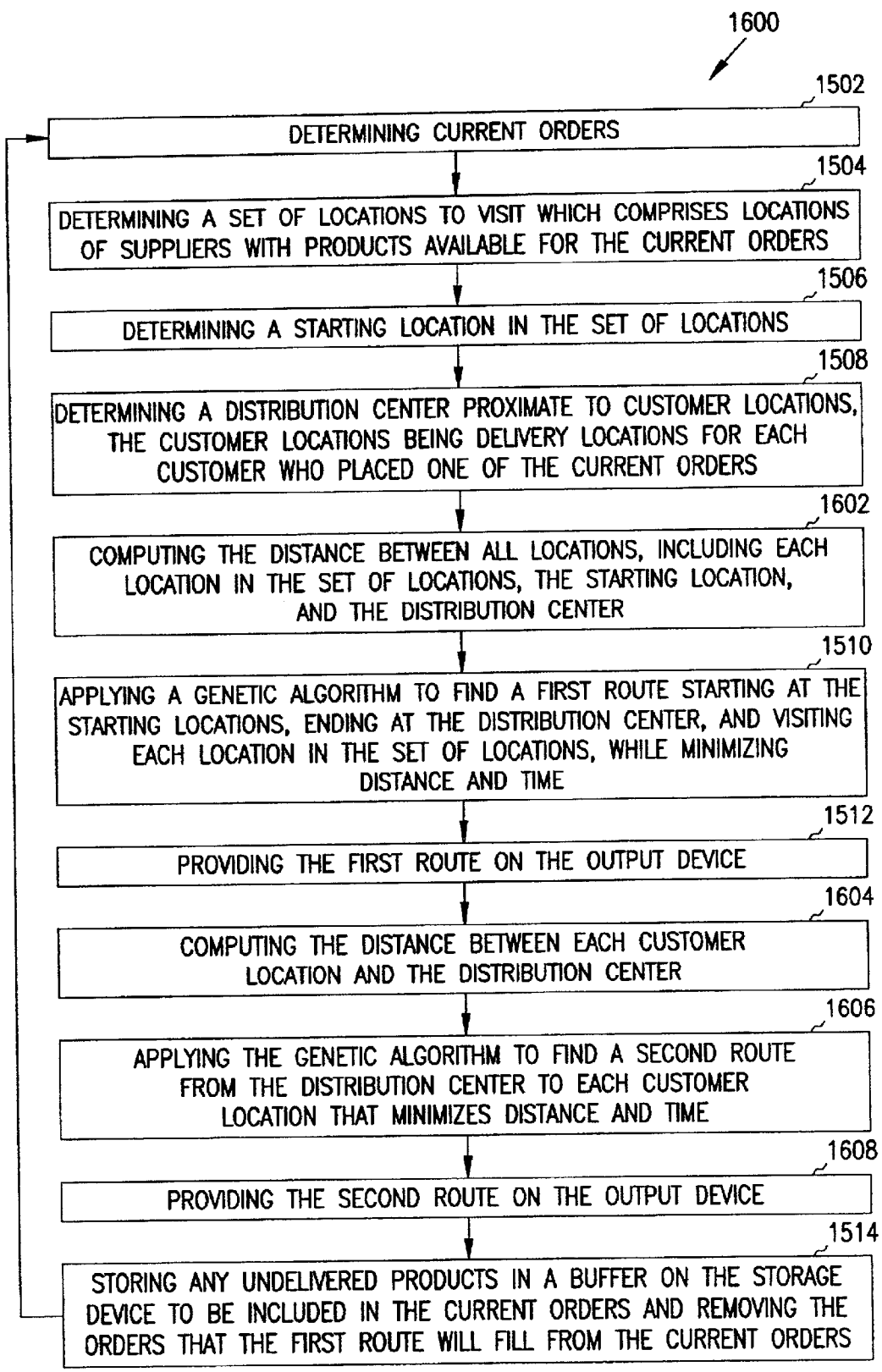
FIG. 16 shows a more detailed flow chart of alternate embodiments of the method for finding distribution chains to satisfy customer demand of FIG. 15.

FIG. 16 shows a more detailed flow chart of alternate embodiments 1600 of the method 1500 for finding distribution chains to satisfy customer demand of FIG. 15. In one embodiment, the method 1500 further comprises computing the distance between all locations, including each location in the set of locations, the starting location, and the distribution center 1602. In another embodiment, the method 1500 further comprises computing the distance between each customer location and the distribution center 1604. In another embodiment, the method 1500 further comprises applying the genetic algorithm to find a second route from the distribution center to each customer location that minimizes distance and time 1606. In another embodiment, the method 1500 further comprises providing the second route on the output device 1608.

Figure 17:
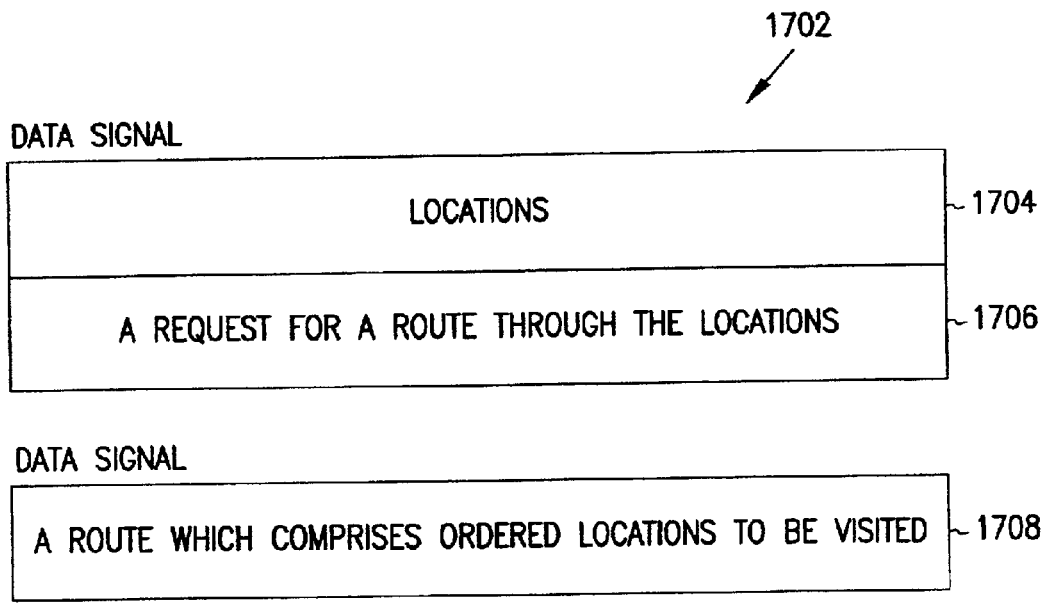
FIG. 17 shows example embodiments of data signals to be communicated by an example embodiment of a method for solving the TSP.

FIG. 17 shows example embodiments of data signals 2702 and 1708 to be communicated by an example embodiment of a method for solving the TSP. One aspect of the present invention is a data signal 1702 having a data structure stored thereon, comprising: a first field containing locations 1704 and a second field containing a request for a route through the locations in the first field 1706. Another aspect of the present invention is a data signal 1708 having a data structure stored thereon, comprising: a field containing a route which comprises ordered locations to be visited. In one embodiment, the route of data signal 1708 is a delivery route. In another embodiment, the route of data signal 1708 is a pickup route.

Figure 18:
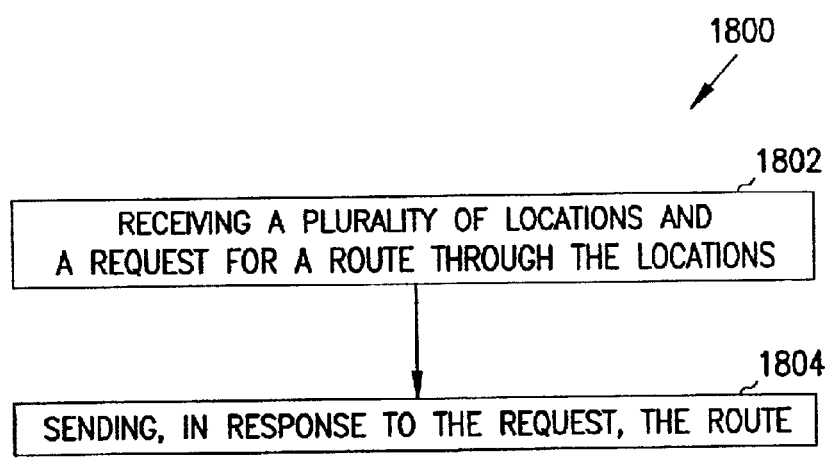
FIG. 18 shows an example embodiment of a method of communication for a user interface to a method for solving the TSP.

FIG. 18 shows an example embodiment of a method 1800 of communication for a user interface to a method for solving the TSP. One aspect of the present invention is a method 1800 of communication, comprising: receiving a plurality of locations and a request for a route through the locations 1802 and sending, in response to the request, the route 1804. This method may be implemented on a server computer in a client-server system.

Figure 19:
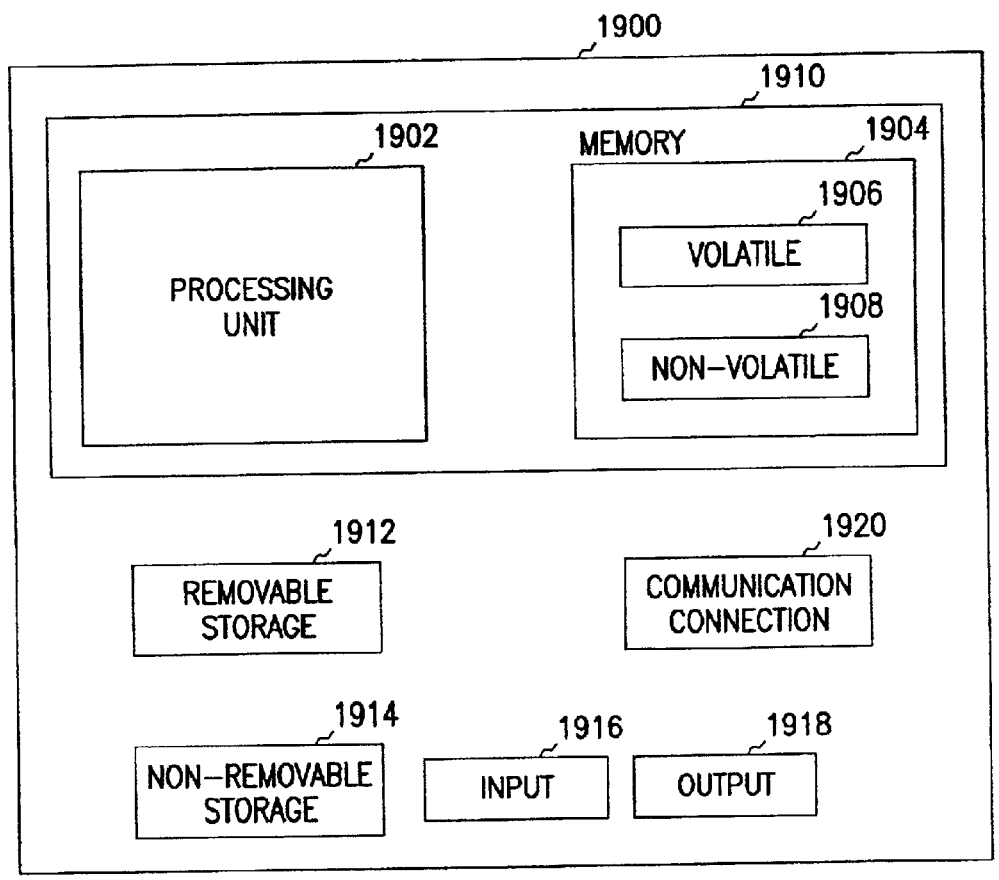
FIG. 19 shows an example of a suitable computing system environment for implementing embodiments of the present invention, such as those shown in FIGS. 6A, 6B, and 7–18.

FIG. 19 shows an example of a suitable computing system environment 1900 for implementing embodiments of the present invention, such as those shown in FIGS. 6A, 6B, and 7–18. Various aspects of the present invention are implemented in software, which may be run in the environment shown in FIG. 19 or any other suitable computing environment. The present invention is operable in a number of other general purpose or special purpose computing environments. Some computing environments are personal computers, server computers, hand held devices, laptop devices, multiprocessors, microprocessors, set top boxes, programmable consumer electronics, network PCS, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or implement particular abstract data types. In a distributed computing environment, program modules may be located in local or remote storage devices.

FIG. 19 shows a general computing device in the form of a computer 1910, which may include a processing unit 1902, memory 1904, removable storage 1912, and non-removable storage 1914. The memory 1904 may include volatile 1906 and non-volatile 1908 memory. Computer 1910 may include—or have access to a computing environment that includes—a variety of computer-readable media, such as volatile 1906 and non-volatile memory 1908, removable 1912 and non-removable storage 1914. Computer storage includes RAM, ROM, EPROM & EEPROM, flash memory or other memory technologies, CD-ROM, digital versatile disks (DVD) or other optical disk storage, magnetic cassettes, magnetic tape, magnetic disk storage or other magnetic storage devices, or any other medium capable of storing computer-readable instructions. Computer 1910 may include—or have access to a computing environment that includes—input 1916, output 1918, and a communication connection 1920. The computer 1910 may operate in a networked environment using a communication connection 1920 to connect to one or more remote computers. The remote computer may include a personal computer, server, router, network PC, a peer device or other common network node, or the like. The communication connection 1920 may include a local area network (LAN), a wide area network (WAN) or other networks. Data signals, such as the ones shown in FIG. 18, may be communicated using the communication connection 1920. A data signal may be sent over a wired network or direct-wired connection or wireless media such as acoustic, RF, infrared or other wireless media.

It is to be understood that the above description is intended to be illustrative, and not restrictive. Many other embodiments will be apparent to those of skill in the art upon reviewing the above description. For instance, TBD. Further embodiment will be apparent to those of ordinary skill in the art. The scope of the invention should, therefore, be determined with reference to the appended claims, along with the full scope of equivalents to which such claims are entitled.

What is claimed is:

1. A computer readable medium having computer-executable instructions for performing a method for solving a traveling salesman problem, the method comprising:
   selecting a set of locations to visit;
   selecting a starting point and an ending point from the set of locations;
   applying a search method to the set of locations, the search including a genetic algorithm, the genetic algorithm including an objective function to simultaneously minimize distance and time; and
   providing a route as a solution to the traveling salesman problem, the route being from the starting point to the ending point, and visiting all locations in the set of locations, wherein the objective function evaluated the route to a value that is lower than any other path searched.

2. The computer readable medium as recited in claim 1, wherein the genetic algorithm generates populations of size $2^k$, where the set of locations is of size k.

3. The computer readable medium as recited in claim 2, wherein the genetic algorithm comprises: a selection operation, a crossover operation, and a mutation operation.

4. The computer readable medium as recited in claim 3, wherein the genetic algorithm further comprises: encoding locations into chromosomes, the chromosome having the same number of positions as k, the locations being represented in each position by an integer.

5. The computer readable medium as recited in claim 4, wherein the selection operation is CHC selection.

6. The computer readable medium as recited in claim 4, wherein the mutation operation comprises swapping two locations at two random positions in a chromosome.

7. The computer readable medium as recited in claim 4, wherein the crossover operation has a crossover probability between about 0.6 and 0.9.

8. The computer readable medium as recited in claim 4, wherein the mutation operation has a mutation probability between about 0.001 and 0.01.

9. The computer readable medium as recited in claim 4, wherein the crossover operation is greedy crossover.

10. A computer readable medium having computer-executable instructions for performing a method for finding a route in a supply chain, the method comprising:
    accessing a set of orders;
    selecting a set of supplier locations to visit to pick up products to fill the set of orders;
    searching for pickup paths visiting each supplier location in the set of supplier locations, by applying a genetic algorithm that simultaneously minimizes distance and time; and
    providing a pickup route which comprises a pickup path that best simultaneously minimizes distance and time compared with all the other pickup paths searched.

11. The method as recited in claim 10, further comprising:
    accessing operational constraint information.

12. The method as recited in claim 11, wherein selecting supplier locations to fill the orders includes satisfying the operational constraint information.

13. The computer readable medium as recited in claim 10, wherein accessing the set of orders includes accessing current orders and buffered orders.

14. The computer readable medium as recited in claim 13, wherein accessing the set of orders further includes accessing orders for a particular delivery time period.

15. The computer readable medium as recited in claim 10, wherein selecting the set of supplier locations to visit to pick up products to fill the set of orders comprises:
    computing a distance between each supplier location in the set of supplier locations; and
    eliminating redundancies in the set of supplier locations by selecting a first supplier over a second supplier, when the first supplier's available products and second supplier's available products are the same, but the first supplier has more available products to fill the orders than the second supplier.

16. The computer readable medium as recited in claim 15, wherein the set of supplier locations includes a distribution center.

17. The computer readable medium as recited in claim 16, wherein searching for pickup paths visiting each supplier location in the set of supplier locations further comprises searching for pickup paths ending at the distribution center.

18. The computer readable medium as recited in claim 17, wherein the pickup route ends at the distribution center.

19. The computer readable medium as recited in claim 10, further comprising:
    determining a set of customer locations for each customer placing an order in the set of orders;
    searching for delivery paths visiting each customer location in the set of customer locations, by applying a genetic algorithm that simultaneously minimizes distance and time; and
    providing a delivery route, which comprises a path that best simultaneously minimizes distance and time compared with all the other delivery paths searched.

20. The computer readable medium as recited in claim 19, further comprising:
    computing a distance between each customer location in the set of customer locations.

21. The computer readable medium as recited in claim 20, wherein the set of customer locations includes a distribution center.

22. The computer readable medium as recited in claim 21, wherein searching for delivery paths visiting each customer location in the set of customer locations further comprises searching for delivery paths starting at the distribution center.

23. The computer readable medium as recited in claim 22, wherein the delivery route begins at the distribution center.

24. A method of searching among locations for paths, comprising:
    randomly generating an initial population of chromosomes to be a current population, each chromosome holding a predetermined number of integers with one integer at each position in the chromosome, each integer representing one location from a set of locations;
    calculating a fitness for each chromosome in the current population, the fitness representing distance and time simultaneously;

selecting one or more pairs of parent chromosomes from the current population based on their fitness to generate a new population;

crossing over the pairs at a randomly chosen point, with crossover probability $p_c$ between about 0.6 and 0.9, to form offspring to generate the new population;

mutating the offspring at each position on their chromosomes, with mutation probability $p_m$ between about 0.001 and 0.01, to modify the new population;

making the current population a previous population and replacing the current population with the new population;

forming new generations by repeating the calculating, selecting, crossing over, mutating, and making acts, until a previous best fitness in the previous population is the same as a current best fitness in the current population; and providing a path represented by a chromosome having a best fitness in the current population.

25. The method as recited in 24, wherein the each population of chromosomes has $2^k$ members, where the set of locations is of size k.

26. A computer readable medium having computer-executable instructions for performing the acts recited in claim 24.

27. The method as recited in 24, wherein crossing over the pairs at the randomly chosen point is carried out by implementing a greedy crossover operation.

28. The method as recited in claim 27, wherein the greedy crossover operation comprises generating offspring in the new population by:

placing all adjacencies shared by a first and a second parent in offspring;

alternating other adjacencies to be placed in offspring between the first and second parents; and when an adjacency produces a conflict, placing a random location in the offspring instead so that a legal tour is maintained.

29. The method as recited in claim 27, wherein the greedy crossover operation comprises generating offspring by:

repeatedly placing a shortest parental adjacency to a location not yet visited in an offspring, if such shortest parental adjacency exists; and otherwise placing a random adjacency in the offspring that maintains a legal tour.

30. The method as recited in 24, wherein selecting the pairs of parent chromosomes from the current population based on their fitness is carried out by implementing a CHC selection operation.

31. The method as recited in claim 30, wherein the CHC selection operation comprises:

placing the pairs of parent chromosomes in the new population.

32. The method as recited in claim 31, wherein the CHC selection operation further comprises:

merging the new population with the current population based on fitness.

33. The method as recited in claim 31, wherein the CHC selection operation further comprises:

upon determining premature convergence, retaining a number of the current population based on fitness and replacing the rest of the current population with randomly generated chromosomes.

34. A computer system for finding distribution chains to satisfy customer demand, comprising:

a storage device;

an output device; and a processor programmed for repeatedly performing a method, the method comprising:

determining current orders;

determining a set of locations to visit which comprises locations of suppliers with products available for the current orders;

determining a starting location in the set of locations;

determining a distribution center proximate to customer locations, the customer locations being delivery locations for each customer who placed one of the current orders;

applying a genetic algorithm to find a first route starting at the starting location, ending at the distribution center, and visiting each location in the set of locations, while minimizing distance and time;

providing the first route on the output device; and storing any undelivered products in a buffer on the storage device to be included in the current orders and removing the orders that the first route will fill from the current orders.

35. The system as recited in claim 34, wherein the method further comprises:

computing the distance between all locations, including each location in the set of locations, the starting location, and the distribution center.

36. The system as recited in claim 34, wherein the method further comprises:

applying the genetic algorithm to find a second route from the distribution center to each customer location that minimizes distance and time; and providing the second route on the output device.

37. The system as recited in claim 36, wherein the method further comprises:

computing the distance between each customer location and the distribution center.

38. The system as recited in claim 34, wherein the processor is a parallel processor.

* * * * *